United States Patent
Young et al.

(10) Patent No.: US 11,631,909 B2
(45) Date of Patent: Apr. 18, 2023

(54) METHODS AND SYSTEMS FOR SCALABLE DIRECT RECYCLING OF BATTERIES

(71) Applicant: Li Industries, Inc., Blacksburg, VA (US)

(72) Inventors: David Young, Sudbury, MA (US); Zheng Li, Blacksburg, VA (US); Michael W. Ellis, Blacksburg, VA (US); Nolan D. Schmidt, Pembroke, VA (US); Xu Han, Merion Station, PA (US)

(73) Assignee: LI INDUSTRIES, INC., Blacksburg, VA (US)

( * ) Notice: Subject to any disclaimer, the term of this patent is extended or adjusted under 35 U.S.C. 154(b) by 154 days.

(21) Appl. No.: 17/298,276

(22) PCT Filed: Nov. 26, 2019

(86) PCT No.: PCT/US2019/063305
§ 371 (c)(1),
(2) Date: May 28, 2021

(87) PCT Pub. No.: WO2020/112813
PCT Pub. Date: Jun. 4, 2020

(65) Prior Publication Data
US 2022/0029217 A1 Jan. 27, 2022

Related U.S. Application Data

(60) Provisional application No. 62/772,243, filed on Nov. 28, 2018.

(51) Int. Cl.
*H01M 10/54* (2006.01)
*H01M 10/0525* (2010.01)

(52) U.S. Cl.
CPC ....... *H01M 10/54* (2013.01); *H01M 10/0525* (2013.01)

(58) Field of Classification Search
CPC .................................................. H01M 10/54
See application file for complete search history.

(56) References Cited

U.S. PATENT DOCUMENTS 8,846,225 B2 9/2014 Sloop
2003/0082453 A1 5/2003 Numata et al.
(Continued)

FOREIGN PATENT DOCUMENTS

CN 101192693 A 6/2008
CN 102703706 A 10/2012
(Continued)

OTHER PUBLICATIONS

International Preliminary Report on Patentability dated May 25, 2021, Written Opinion of the International Searching Authority, and International Search Report dated Feb. 6, 2020, for International Application No. PCT/US2019/063305, 9 pages.
(Continued)

*Primary Examiner* — Peter F Godenschwager
(74) *Attorney, Agent, or Firm* — Cooley LLP

(57) ABSTRACT

A method includes processing at least one battery into a plurality of core sections. Each core section in the plurality of core sections includes an anode section, a cathode section including a cathode material, a separator section disposed between the anode section and the cathode section, and an electrolyte. The method also includes disposing the plurality of core sections into a solvent so as to produce a mixture of cathode materials from the plurality of core sections. The solvent and the electrolyte form an ionic conductive medium, and the mixture of the cathode materials is char-
(Continued)

acterized by a substantially homogeneous distribution of an active element in the cathode material.

27 Claims, 13 Drawing Sheets

(56) References Cited

U.S. PATENT DOCUMENTS

| | | |
|---|---|---|
| 2007/0134546 A1 | 6/2007 | Hashimoto |
| 2013/0266855 A1 | 10/2013 | Kim et al. |
| 2013/0302226 A1 | 11/2013 | Wang et al. |
| 2016/0372802 A1 | 12/2016 | Chiang et al. |
| 2018/0261894 A1 | 9/2018 | Wang et al. |
| 2022/0029217 A1 | 1/2022 | Young et al. |

FOREIGN PATENT DOCUMENTS

| | | |
|---|---|---|
| CN | 103915661 A | 7/2014 |
| CN | 105375077 A | 3/2016 |
| JP | 2013111543 A | 6/2013 |
| WO | WO2020/112813 A1 | 6/2020 |

OTHER PUBLICATIONS

Extended European Search Report for European Application No. 19890650.5, dated Jul. 29, 2022, 8 pages.

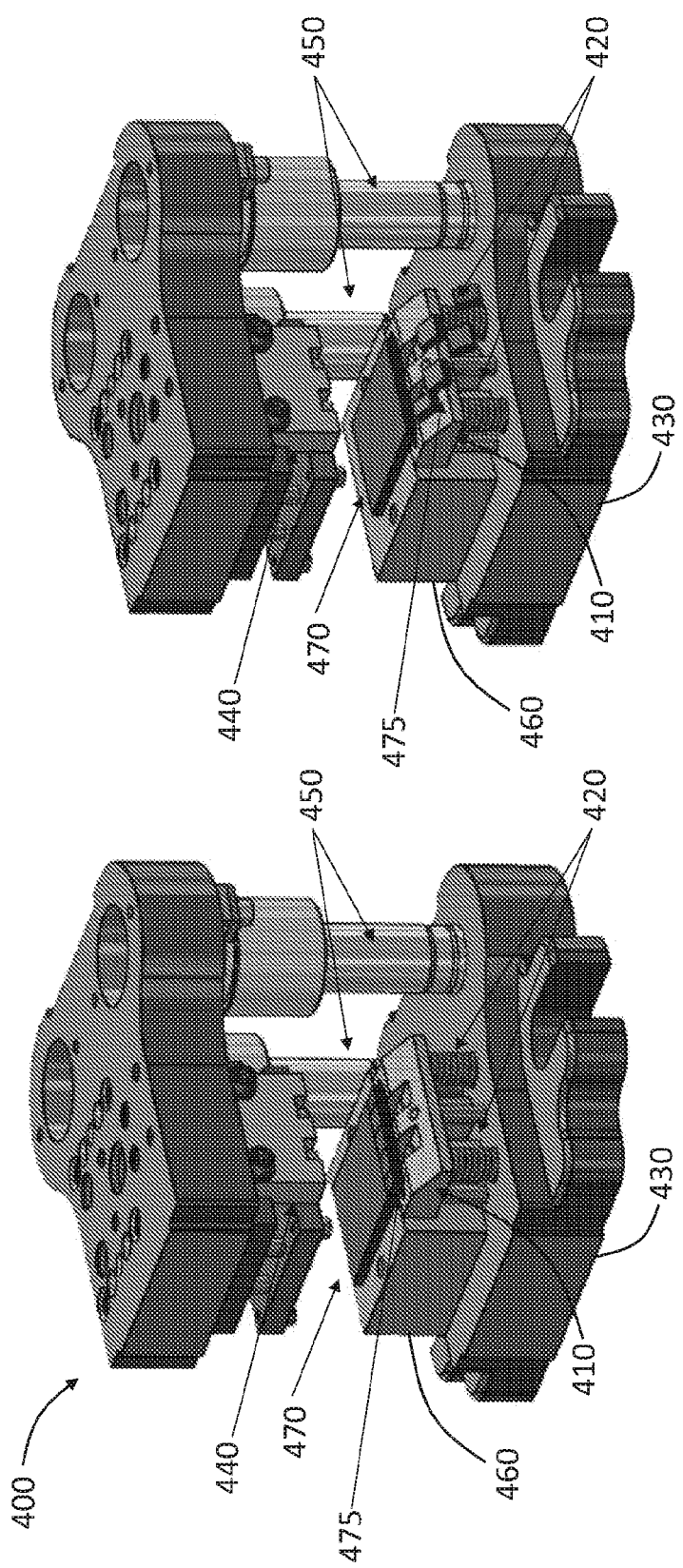

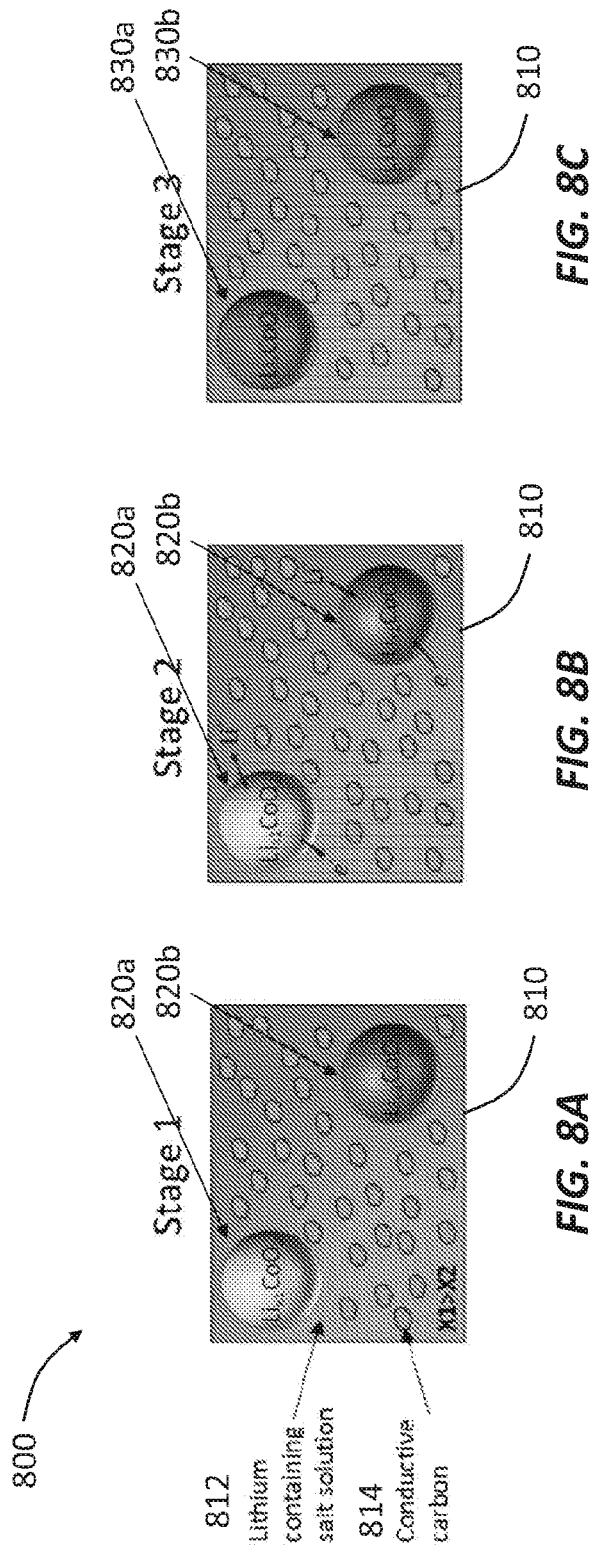

METHODS AND SYSTEMS FOR SCALABLE DIRECT RECYCLING OF BATTERIES

CROSS-REFERENCE TO RELATED APPLICATION

This application is a U.S. National Stage Application under 35 U.S.C. § 371 of International Application No. PCT/US2019/063305, filed Nov. 26, 2019, which claims priority to U.S. Patent Application No. 62/772,243, filed Nov. 28, 2018, and entitled "METHODS AND SYSTEMS FOR SCALABLE DIRECT RECYCLING OF BATTERIES", the disclosures of which are hereby incorporated herein by reference in their entireties for all purposes.

TECHNICAL FIELD

The present disclosure relates generally to systems, apparatus, and methods for recycling energy storage devices, and more particularly to recycling of lithium-ion batteries and their components.

BACKGROUND

Lithium-ion batteries have high power and energy density, long cycle life, high potential, and low self-discharge rate. As a result, they are usually regarded as the most promising approach for near-term energy storage and widely used in consumer electronics, electric vehicles, and grid energy storage. However, lithium-ion batteries also have several drawbacks, including limitations of battery material supply, environmental hazards during production or end of life, and the high cost of manufacturing.

SUMMARY

Systems, apparatus, and methods are disclosed for recycling energy storage devices. In some embodiments, a method includes processing at least one battery into a plurality of core sections. Each core section in the plurality of core sections includes at least an anode section including at least an anode material, a cathode section including at least a cathode material, a separator section disposed between the anode section and the cathode section, and an electrolyte. The method also includes disposing the plurality of core sections into a solvent so as to produce a mixture of cathode materials and other components from the plurality of core sections. The solvent and the electrolyte form an ionic conductive medium, and the mixture of the cathode materials is characterized by a substantially homogeneous distribution of an active element in the cathode material.

In some embodiments, a system includes a first device and a second device. The first device is configured to process at least one battery into a plurality of core sections, and each core section in the plurality of core sections includes an anode section, a cathode section including a cathode material, a separator section disposed between the anode section and the cathode section; and an electrolyte. The second device is configured to receive the plurality of core sections and disperse or dissolve the plurality of core sections so as to produce a mixture of cathode materials from the plurality of core sections. The solvent and the electrolyte form an ionic conductive medium, and the mixture of the cathode materials is characterized by a substantially homogeneous distribution of an active element in the cathode material.

In some embodiments, a method for recycling at least one battery includes cutting a plurality of lithium ion batteries into a plurality of core sections. A first lithium ion battery in the plurality of lithium ion batteries has a first state of charge (SOC), and a second lithium ion battery in the plurality of lithium ion batteries has a second SOC different from the first SOC. Each core section in the plurality of core sections includes an anode section including an anode material, a cathode section including a cathode material, a separator section disposed between the anode section and the cathode section, and an electrolyte. The method also includes disposing the plurality of core sections into a solvent so as to produce a mixture of cathode materials and anode materials from the plurality of core sections. The solvent and the electrolyte form an ionic conductive medium, and the mixture of the cathode materials and the anode materials includes a nonstoichiometric compound of an active element in the cathode material and is characterized by a substantially homogeneous distribution of the active element in the cathode material. The method further includes extracting the cathode materials from the mixture of the cathode materials and the anode materials and relithiating the cathode materials extracted from the mixture of the cathode materials and the anode materials to produce a battery-grade cathode material.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4D illustrate a method of processing a battery into multiple core sections, in accordance with some embodiments.

FIGS. 8A-8C illustrate a lithium equilibration process during scalable direct recycling of batteries, in accordance with some embodiments.

DETAILED DESCRIPTION

Figure 1:
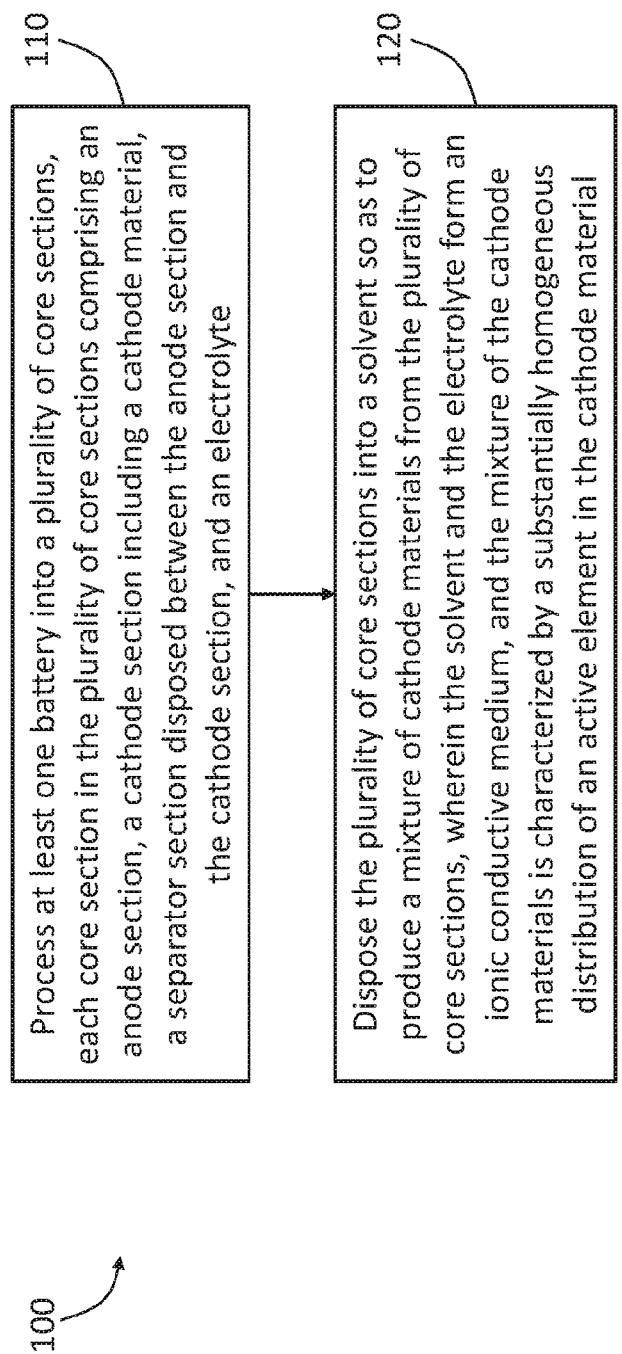
FIG. 1 is a flowchart illustrating a method of recycling the cathode material of batteries, in accordance with some embodiments.

To address the drawbacks associated with lithium-ion batteries, recycling of lithium-ion batteries can be employed to decrease the total lifetime energy consumption, battery material demand, and the manufacturing cost. For example, during battery production, wrought aluminum and cathode materials typically take up around half and 10% to 14%, respectively, of the cradle-to-gate energy consumption or greenhouse gas (GHG) emission. Recycling aluminum and cathode material can therefore significantly reduce the energy consumption and GHG emission of battery production.

Recycling of batteries can be implemented via at least three approaches: smelting recycling, hydrometallurgical recycling, and direct recycling. In smelting battery recycling, end-of-life batteries are directly smelted to recover valuable metals, such as Co, Ni, and Cu, which are typically in the form of an alloy from the bottom of smelters. A leaching process is usually performed to separate the recovered metals.

Smelting can be employed to economically recover some elements (e.g., Co, Mn, Ni, etc.) from several types of cathode materials, including $LiCoO_2$, $LiMn_2O_4$, and $LiNi_xMn_yCo_zO_2$ where $x+y+z=1$. In some embodiments, any one of x, y, or z can be zero. However, it is generally not economically advantageous to recycle $LiFe_tM_{1-t}PO_4$, where M=Mn, Ni, Co, V or metal elements, or a combination of several metal elements (LFMP) cathodes via smelting, because metals that are recovered from LFMP batteries are less valuable. In addition, lithium and aluminum during smelting usually end up in a slag. Extensive and costly processing is typically conducted to separate the metals before they can be used to construct new batteries. Furthermore, the smelting process itself often generates extensive waste gases, thereby increasing the overall cost due to subsequent waste treatment.

Hydrometallurgical recycling processes separate and/or isolate battery constituents before further processing. This approach is also applicable to recycle Ni-MH batteries. For lithium-ion batteries, lithium is ultimately recovered as $Li_2CO_3$, and other major materials such as Co, Ni, and Al can also be recovered. For Ni-MH batteries, rare earths and nickel can be recovered. Although hydrometallurgical recycling does not involve high temperature and high volume, such approach changes the morphology of battery cathode materials, thereby rendering the cathode materials unsuitable for re-use without further processing. More information about hydrometallurgical recycling can be found in U.S. Pat. No. 8,846,225, entitled "Reintroduction of lithium into recycled battery materials," which is hereby incorporated by reference in its entirety.

Direct recycling of batteries, compared to the two approaches described above, can recover valuable cathode materials, as well as anode materials, current collectors, binder, and electrolyte. The approaches includes only low-temperature processes and can preserve the structure, morphology, and electrochemical properties of valuable material. Some methods of direct recycling include physically disassembling a battery into individual components before recovering the electrode materials. For example, the cathode, the anode, and the separator of a battery may be separated before the anode/cathode materials can be recovered via chemical processing. Such physical separation of batteries is usually time consuming and may render it challenging to recycle batteries on a large scale.

To increase the efficiency of direct recycling and scale direct recycling to industry levels, methods and systems described herein employ a scalable direct recycling technique that can recycle batteries without physically separating the cathodes from the anodes before electrode material recovery. In this technique, a battery is first processed into smaller pieces (also referred to as core sections), each of which includes an anode section, a cathode section, a separator, and an electrolyte. This process can be performed on a large scale via, for example, a punch machine (see, e.g., FIGS. 4A-4D below).

The individual pieces then undergo chemical processing in a solvent, which can dissolve the binder that bonds the electrodes materials to the corresponding current collectors and produce a mixture of cathode materials from the core sections (usually also including anode materials from the core sections). The solvent and the electrolyte also form an ionic conductive medium, which can facilitate the transport of the active element in the cathode material (e.g., lithium, proton, and/or hydroxyl) within the mixture. This transport can substantially homogenize the distribution of the active element within the cathode materials. The cathode materials from the chemical processing are usually deficient in the ratio of the active element (e.g., lithium deficient). However, such deficiency does not affect the overall efficiency of the recycling technique, because as long as the distribution of the active element is uniform within the cathode materials, further processing (e.g., relithiation) can be readily performed to replenish the active element to produce battery-grade cathode materials.

Since each step in the technique described herein can be readily scaled up, the entire recycling process can also be implemented in a mass scale. In addition, the transport of active element during the chemical processing allows simultaneous recycling of batteries in different states of charge, thereby obviating the costly and time consuming steps of determining the states of charge in some other recycling techniques.

FIG. 1 is a flowchart illustrating a method 100 of recycling the cathode material of batteries, in accordance with some embodiments. Typically the cost of a battery is dominated by the cost of the battery component materials (e.g., about 50% or more), which in turn is dominated by the cost of cathode materials. For example, the cathode material in a battery can be about 2 to 4 times as valuable as other constituent elements in the same battery. Therefore, recycling cathode materials via the method 100 can make a significant contribution to cost savings.

The method 100 includes, at 110, processing one or more batteries into multiple core sections, each of which includes an anode section, a cathode section including a cathode material, a separator section disposed between the anode section and the cathode section, and an electrolyte. Each core section can also include current collector sections, such as a first current collector section coupled to the anode section and a second current collector section coupled to the cathode section. In other words, the processing at 110 converts each battery component (e.g., anode, cathode, separator, and current collectors) into multiple pieces.

In some embodiments, each core section includes one anode section and one cathode section. In some embodiments, each core section can include multiple anode sections and multiple cathode sections. For example, the battery can have a jellyroll architecture and the processing at 110 can cut the battery perpendicular to the side wall of the cylinder (see, e.g., FIG. 5A). As a result, each core section from the processing at 110 also includes a jellyroll that has multiple layers of anodes and cathodes. In another example, the battery can have prismatic architecture including a stack of battery cells, and each stack includes an anode, a cathode, and a separator (see, e.g., FIG. 5B). The processing at 110 can cut the battery along the depth of the stack, thereby producing core sections including multiple layers of anode/cathode/separator combinations. Therefore, the method 100 can be implemented regardless of the battery architecture, demonstrating great flexibility in practice.

In some embodiments, the cathode section and/or the anode section include at least one of active materials, conductive materials (e.g., conductive carbon), binder, and a current collector. In some embodiments, each core section can include at least one of an anode section, a cathode section, a separator, or an electrolyte. In some embodiments, each core section can include only the cathode section. In some embodiments, each core section can include only the anode section. In some embodiments, each core section can include only: (1) electrolyte and (2) either a cathode section or an anode section. In some embodiments, each core section can include only (1) electrolyte, (2) separator, and (3) either a cathode section or anode section. In some embodiments each core section can additionally include a battery packaging material.

In some embodiments, the processing at 110 includes deforming the at least one battery prior to cutting the at least one battery to facilitate the cutting of the at least one battery into multiple core sections. For example, a battery with a jellyroll architecture can be compressed in the cutting direction, prior to cutting, so as to create a deformed battery. The thickness of the deformed battery in the cutting direction can be similar to the thickness of a prismatic battery of similar size. As a result, the similar thicknesses in the cutting direction for each battery facilitates the cutting multiple batteries at the same time, thereby improving the processing efficiency.

The method 100 also includes, at 120, disposing the core sections into a solvent so as to produce a mixture of cathode materials from the core sections, i.e. cathode materials from different core sections mix together to form the mixture. The mixture can also include other materials, such as anode materials, binder, separators, and current collectors. However, for illustrative purposes, the description herein focuses on the cathode materials. More details about separating the cathode materials from other materials can be found below with reference to FIGS. 6 and 7. The solvent and the electrolyte form an ionic conductive medium, and the mixture of the cathode materials is characterized by a substantially homogeneous distribution of an active element in the cathode material due to transport of the active element (or its ions) within the mixture facilitated by the ionic conductive medium. In some embodiments, the ionic conductive medium is also conductive to electrons.

The method 100 can be implemented to recover various types of cathodes materials. In some embodiments, the cathode material can include a cobalt rich material, such as $LiCoO_2$. In some embodiments, the cathode material can include a nickel rich material, such as $LiNi_xMn_yCo_zO_2$, where $x+y+z=1$, or in more general format, $LiNi_aMn_bCo_cA_dO_2$, where A=Al, Zr, Mg, etc., $a+b+c+d=1$. In some embodiments, the cathode material can include an L-M-O system, such as $LiMn_yO_4$. In some embodiments, the cathode material can include $LiFe_tM_{1-t}PO_4$.

In some embodiments, the cathode material can include a first material coated by a second material. For example, the cathode material can include $LiCoO_2$ coated with $Al_2O_3$. In some embodiments, the cathode material can include a first material (also referred to as a host material) doped with a second material (also referred to as a dopant). For example, the cathode material can include $LiMn_{2-x}Al_xO_{4-y}$. Any other appropriate cathode material known in the art can also be used herein.

In some embodiments, the cathode of the battery includes a film made of any of the cathode materials described herein and mixed with carbon and a binder (e.g., polyvinylidene fluoride or PVDF). The film can be then disposed on a current collector (e.g., aluminum or copper). In an end of life battery, the cathode material can be depleted of the active element (e.g., lithium). Using $LiCoO_2$ as an example, the cathode material can be denoted as $Li_xCoO_2$, where x is less than 1 (i.e., $x<1$). In another example, the cathode material can include $LiNi_aMn_bCo_cA_dO_2$, where A=Al, Zr, Mg, etc., $a+b+c+d=1$, and in an end of life battery, the cathode material can be denoted as $Li_xNi_aMn_bCo_cA_dO_2$, where x is less than 1.

The anode material of the anode sections in the battery can also have various options. In some embodiments, the anode material includes graphite. In some embodiments, the anode material includes tin, tin-cobalt alloy, silicon, or silicon oxides. In some embodiments, the anode material includes $Li_4Ti_5O_{12}$. In some embodiments, the anode of the battery can be formed of graphite mixed with a binder (e.g., PVDF) and disposed on an anode current collector (e.g. copper or aluminum).

In some embodiments, the electrolyte in the battery can include a lithium based salt in an organic solvent. The lithium based salt can be, for example, $LiPF_6$. The organic solvent can include, for example, ethylene carbonate (EC), dimethyl carbonate (DMC), ethylmethyl carbonate (EMC), diethyl carbonate (DEC), propylene carbonate (PC), and/or their combinations.

The solvent used in the method 100 is configured to dissolve the binder in the electrodes (including cathode and anode) and further configured to form the ionic conductive medium with the electrolyte. In some embodiments, the solvent can include a polar solvent that can dissolve binders such as PVDF. Examples of such polar solvents can include dimethylformamide (DMF), dimethyl sulfoxide (DMSO), N-methyl-2-pyrrolidone (NMP), and dimethylacetamide (DMAc), among others. In some embodiments, the solvent can include water that can dissolve aqueous soluble binders. Examples of such binders can include poly(ethylene oxide) (PEO), and carboxymethyl cellulose (CMC), among others.

The one or more batteries at step 110 of the method 100 can be processed into multiple core sections via various techniques. In some embodiments, a punch machine can be employed to cut the batteries into pieces (see, e.g., FIGS. 4A-4D). In some embodiments, the batteries can be cut via a laser cutter. In some embodiments, the batteries can be cut via a water jet cutter.

In some embodiments, the processing at 110 is performed with a rotary cutting wheel. In some embodiments, the processing at 110 is performed with a fly knife or a sawing blade, which moves along a direction that is perpendicular to the depth of the stack of each core section.

Each battery to be recycled via the method 100 can be processed into any appropriate number of core sections. On the one hand, increasing the number of core sections produced from each battery can increase the contact area (or the ratio of contact area to volume) of each core section with the solvent. On the other hand, cutting the battery into too many pieces may introduce undesired debris and impurities. The number of core sections produced from each battery can also depend on the dimensions of the battery (e.g., a greater number of core sections can be produced from a larger battery). In some embodiments, the number of core sections produced from each battery can be about 2 to about 50 (e.g., about 2, about 3, about 5, about 10, about 20, about 30, about 40, or about 50, including any values and sub ranges in between).

The cathode materials produced from step 120 in the method 100 are characterized by a substantially homogeneous distribution of the active element. As used herein, substantially homogeneous distribution of the active element refers to the situation where the atomic ratios of the active element in the compounds that form the cathode materials are substantially the same. For example, the cathode materials can include $Li_xCoO_2$, where x is equal to 1 (e.g., fully lithiated) or less than 1 (i.e. lithium deficient), and different molecules of $Li_xCoO_2$ in the cathode materials produced after step 120 have substantially the same x.

In some embodiments, the homogeneous distribution of the active element can be characterized by the standard deviation of the atomic ratio distribution. For example, the cathode material can include $Li_xCoO_2$ and the standard deviation of x can be substantially equal to or less than 0.1 (e.g., about 0.1, about 0.09, about 0.08, about 0.07, about 0.06, about 0.05, or less, including any values and sub ranges in between). In some embodiments, the average value of x can be denoted as $x_0$, and the x in each $Li_xCoO_2$ molecule can be about 10% within $x_0$ (about 10%, about 9%, about 8%, about 7%, about 6%, about 5%, about 4%, about 3%, about 2%, about 1%, or less, including any values and sub ranges in between), i.e. between $0.9x_0$ and $1.1x_0$, so as to form a homogeneous distribution of the active element. The above definitions can be similarly applied to any other cathode material described herein.

To experimentally estimate the distribution of active element in the cathode material, at least two methods can be employed. In some embodiments, cathode materials at different locations in the mixture can be sampled and characterized using, for example, inductively coupled plasma atomic emission spectroscopy (ICP-AES) to measure the atomic ratio of the active element. In some embodiments, X-ray tomography can be employed to measure the active element homogeneity of an individual particle on a microscale.

In some embodiments, the method 100 can be employed to batch recycle batteries having different states of charge. For example, the batteries can include a first battery at a first state of charge and a second battery having a second state of charge. After step 120, cathode materials from these different batteries are mixed together to form the mixture, and the transport process that occurs during step 120 can substantially homogenize the distribution of the active element (e.g., Li). The cathode materials after step 120 can then be relithiated to form battery-grade cathode materials.

In some embodiments, the method 100 can be employed to batch process batteries having different degrees of deficiency in the active element. For example, the batteries can include a first battery having a first cathode material denoted as $Li_{x1}CoO_2$ and a second battery having a second cathode material denoted as $Li_{x2}CoO_2$, where x1 is different than x2. The method 100 can yield a mixture of the first cathode material and the second cathode material that has a homogeneous distribution of lithium (e.g., $Li_{x3}CoO_2$, where x3 is different from x1 and x2) and prepare the cathode materials for subsequent relithiation.

In some embodiments, inhomogeneity of the active element can occur within a single battery before recycling. In these instances, cathode materials from different core sections may have different degrees of deficiencies in the active element, and the method 100 can substantially homogenize the active element distribution and prepare the cathode materials for subsequent relithiation.

In some embodiments, the transport of the active element during step 120 can be improved by one or more additives in the ionic conductive medium formed by the solvent and the electrolyte. In some embodiments, the additive can include conductive carbon from the anode sections of the core sections. In these instances, the anode sections can include graphite. In some embodiments, the additive can include conductive carbon added into the solvent. For example, carbon powder can be added to the solvent so as to increase the conductivity of the resulting ionic conductive medium. In some embodiments, the additive can include lithium salts added to the solvent to improve the ionic conductivity of the medium.

In some embodiments, the transport of the active element during step 120 can be improved by ultrasonic mixing. In these instances, an ultrasonic transducer can be employed to deliver ultrasonic waves into the vessel that contains the ionic conductive medium so as to increase the transport efficiency.

In some embodiments, the method 100 can further include stirring the ionic conductive medium. In one example, a rocking platform can be employed to hold the vessel that contains the ionic conductive medium and cause the vessel into rocking motion so as to increase the transport efficiency. In another example, one or more impellers or blades can be coupled to the vessel that contains the ionic conductive medium and configured to stir the ionic conductive medium.

In some embodiments, the method 100 can further include increasing the temperature of the ionic conductive medium so as to increase the transport efficiency. For example, a heater can be coupled to the vessel that contains the ionic conductive medium so as to heat up the ionic conductive medium. In some embodiments, any combination of the techniques of improving the transport efficiency described herein can be employed. In some embodiments, the method 100 can further include removal and replenishment of the solvent to control the concentration of electrolyte, anode material, cathode material, and contaminants (e.g. dissolved electrode binders).

In some embodiments, the method 100 can be implemented without an electrochemical process. As used herein, an electrochemical process refers to a process caused or accompanied by the passage of an electric current and involving the transfer of electrons between two substances. In these instances, the method 100 is employed to prepare cathode materials that have a homogeneous distribution of the active element, and these cathode materials can be further replenished with the active element on a large scale.

In some embodiments, the mixture of the cathode materials further includes other components, such as anode materials, current collectors, and separators. In these instances, the cathode materials can be extracted from the mixture for further processing (e.g., relithiation). In some embodiments, the cathode material (e.g., lithium containing compounds) and the anode material (e.g., carbon-based materials, such as graphite) have different density, and thus they can be separated from each other using a density-based separation process (e.g., centrifugal separation). For example, the anode active material can include graphite having a density of about 2 g/cc, and the cathode material can include a metal oxide having a density of about 4-5 g/cc. Such density difference allows a density-based separation process to yield cathode active material that has a uniform but nonstoichiometric amount of lithium.

In some embodiments, the separation of cathode materials from other components comprises a filtration technique. In these instances, the cathode materials have a different particle size than some of the other components. For example, a filtration technique can comprise one or more sieving steps using one or more sieves of different pore size. In some embodiments the filtration technique includes the use of an ultrasonic transducer to break up agglomerations of particles. In some embodiments, the ultrasonic transducer is used to separate cathode materials from other components of the mixture. For example, cathode materials may be physically separated from current collectors or separators using such an ultrasonic transducer. The current collectors, separators, or other larger pieces can be filtered out using a basket or other filtration device.

In some embodiments, the separation process of the cathode materials can be performed in a solvent. In some embodiments, the solvent is water. In other embodiments, the solvent is an organic solvent, including, but not limited to, DMF, NMP, ethanol, methanol, isopropanol, acetone, EC, DMC, EMC, DEC, and PC. In some embodiments, an additive may be added to promote the separation process. In some embodiments, the additive changes the pH of the solution. In some embodiments, the additive raises the pH of the solution. In some embodiments, the additive is LiOH, NaOH, or similar additive. In some embodiments the solvent may be heated to increase the rate or efficacy of separation.

In some embodiments, the separation process of the cathode materials comprises a dissolution technique. Certain components in the mixture of cathode materials, anode materials, current collectors, electrolyte, and/or separators can preferentially dissolve in a solvent. These components can be dissolved and separated from the rest of the mixture. For example, a solution of ammonia can be used to dissolve and remove Cu and/or Al current collectors or other components from the mixture. In another example, a solution of LiOH, NaOH, or similar additive in water may be used to Al current collectors or other components from the mixture. In some embodiments, the mixture may be heated to increase the rate or efficacy of separation.

In some embodiments, the separation of the cathode materials from other components can be conducted via a hydrophobicity separation technique (also referred to as flotation separation or froth flotation). Flotation separation uses a solvent (e.g. a polar solvent, such as water) mixed with an enhancer promoting hydrophobicity of other materials (e.g., kerosene) and a foaming agent (e.g., long chain alcohols, 4-methyl-2-pentanol, pine oil). The enhancer preferentially binds to the components that are hydrophobic. The solvent is aerated to produce a froth comprising primarily of the enhancer, foaming agent, and hydrophobic components. The froth is separated from the solution via a scraping or other surface collection mechanism. The hydrophilic components are then collected from the solution separately. In these instances, the cathode materials have a different level of hydrophobicity from some of the other components. For example, cathode materials, such as $LiCoO_2$, tend to be hydrophilic, while some anode materials, such as graphite, tend to be hydrophobic. Therefore, the anode materials can be removed from the froth, and the cathode materials are collected from the solution underlying the froth. In some embodiments, other additives, such as pH regulators (e.g., sodium carbonate, sodium hydroxide, lithium carbonate, and lithium hydroxide), deflocculants, and depressants (used to increase hydrophilicity of certain compounds, e.g., lime, sodium cyanide, and dextrin) may be used to further promote separation.

In some embodiments, the separation of the cathode materials from other components can be conducted via a heating technique. The heating technique (also referred to as heat treatment) comprises heating the mixture of cathode materials and other components to a temperature so as to promote the degradation or vaporization of certain components of the mixture. In some embodiments, the degradation of certain components is to one or more gaseous compounds. For example, heating the mixture to a certain temperature (e.g., 400 degrees Celsius) or above can degrade or vaporize the binder (e.g., PVDF), the electrolyte (e.g., EC, DMC, EMC, DEC, and PC), solvents (such as those solvents used in other separation processes or at step 120 of method 100), and/or the separator (e.g., polyethylene or polypropylene). Such degradation or vaporization can form gaseous compounds, which can be separated from the liquid mixture. In some embodiments, the mixture is heated to a temperature of about 400, 500, 600, 700, or 800 degrees Celsius and above. In some embodiments, the mixture is heated in air. In some embodiments, the mixture is heated in a relatively inert or neutral atmosphere (e.g., $N_2$, Ar, He, etc.). In some embodiments, the mixture is heated in a reducing atmosphere (e.g., $CO/CO_2$, $H_2$ in $N_2$, Ar, or $H_2O$).

In some embodiments, the separation the cathode materials from other components can be conducted via an eddy current technique. The eddy current technique uses a conveyance system that transports the mixture of cathode materials and other components to one or more rotating magnetic materials. The rotating magnetic materials create an induction field that magnetizes the mixture of cathode materials and other components to different levels of magnetization. The mixture of cathode materials and other components are then ejected to different locations by a strong magnet either attracting or repelling different components to different degrees depending on the component's ratio of electronic conductivity to density. In these instances, the cathode materials have a different ratio of electronic conductivity to density from other components and are therefore ejected to a location separate from the location of the other components.

In some embodiments, the method 100 can further include deactivating the batteries before processing them into multiple core sections. In some embodiments, the deactivation can be conducted by disposing the batteries into a conductive powder such that both the positive and negative electrodes of each battery are in electrical contact with the conductive powder (see, e.g., FIG. 3A below). In some embodiments, the deactivation can be conducted by disposing the batteries into a conductive fluid such that both the positive and negative electrodes of each battery are in electrical contact with the conductive fluid. As a result, the battery is discharged. In some embodiments, the conductive fluid can include a conductive powder and a solvent. In some embodiments, the conductive powder can be suspended in the solvent during use. The conductive powder can include, for example, carbon, metal, conductive oxides, or any other appropriate conductive material. The solvent can include, for example, silicone oil, cooking oil, ethylene glycol, or any other appropriate solvent.

In some embodiments, the solvent includes water. In some embodiments, additives, such as buffers or other pH-adjusting additives, can be added to the aqueous solvent. The additives can raise the pH of the aqueous solvent to suppress corrosion. Additionally, the basic nature of the solvent can neutralize acidic or acid-forming compounds that may be released by the battery. In some embodiments, the battery can be completely submerged in the conductive powder or slurry.

The discharge rate usually depends on the conductivity (or resistivity) of the conductive powder. Therefore, different conductive powders can be used to adjust the discharge rate. In some embodiments, the conductive powder includes a metal (e.g., aluminum powder, iron powder, copper powder, stainless steel powder, etc.). In some embodiments, the conductive powder includes carbon (e.g., graphite powder, carbon black nanopowder, or carbon nanotubes, etc.). In some embodiments, the conductive powder includes conductive oxide (e.g., indium tin oxide (ITO), ZnO, $In_2O_3$, $SnO_2$, nickel oxides, and manganese oxides, etc.). In some embodiments, the properties (e.g. electrical conductivity or packed density) of the conductive powder can be modified to adjust the conductivity by incorporation of a non-conductive or conductive liquid. In some embodiments, the conductive powder can include any combination of the materials descried herein.

In some embodiments, the conductive powders can be further modified to increase their affinity with the solvent being used. For example, in an aqueous solvent, carbon-based conductive powders can be oxidized or polarized to form less hydrophobic compounds that disperse more uniformly in aqueous solvents. This more uniform distribution of conductive powders can increase the conductivity of the solution.

In some embodiments, the deactivation is conducted using the conductive fluid described herein. In these instances, the conductivity of the conductive fluid (and according the discharge rate) can be adjusted by the viscosity, the concentration of the conductive powder in the conductive fluid, and/or the solvent material. For example, the electronic conductivity can increase with respect to the increase of viscosity until reaching a plateau. The ionic conductivity can also increase with respect to the increase of viscosity until reaching a deflection point, after which the ionic conductivity starts decreasing.

In some embodiments, the method 100 can further include estimating the state of discharge of the battery before processing the battery into multiple core sections. In some embodiments, the estimation is performed to determine whether the battery is fully discharged so as to allow safe dissection at step 110 in the method 100. In these instances, a conductive nail can be employed to penetrate through the battery (see, e.g. FIG. 3B below). If the battery passes such test (e.g., without smoke or fire), the battery is then processed into multiple core sections. If, however, the battery does not pass the test, the battery can be disposed into a salt water for hazard control and further discharge.

In some embodiments, the estimation of the state of discharge is performed using a voltage measurement technique. In some embodiments, the voltage measurement technique comprises the placement of conductive probes throughout the discharging medium. The state of discharge of the battery can be estimated from the measured voltage at each probe using finite element analysis or other appropriate methods. In other embodiments, the voltage measurement technique comprises a noncontact voltage scanning tool to estimate the state of discharge of the battery.

In some embodiments, the estimation of the state of discharge is performed using a current measurement technique. The change in the state of discharge can be correlated to the current. In some embodiments, a Hall effect sensor is used to estimate the state of discharge.

The above description of the method 100 mostly uses lithium ion batteries as an example for illustrative purposes only. In practice, the method 100 can be employed to recycle any other appropriate type of energy storage devices. For example, the method 100 can be employed to recycle capacitors, including lithium ion capacitors and supercapacitors (also referred to as ultra-capacitors).

Figure 2:
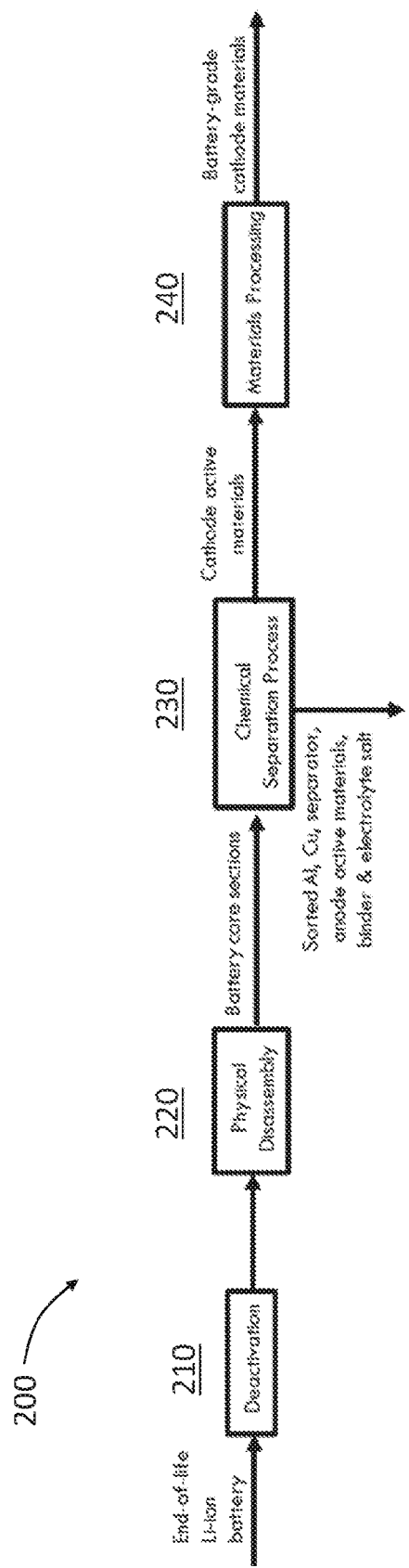
FIG. 2 is a flowchart illustrating a method of scalable direct recycling of batteries, in accordance with some embodiments.

FIG. 2 is a flowchart illustrating a method 200 of scalable direct recycling of batteries, in accordance with some embodiments. The method 200 includes, at 210, deactivating batteries (e.g., end-of-life batteries, and/or defect battery products) so as to ensure safety during subsequent processing of the batteries. The deactivation can be achieved by short circuiting the batteries to fully discharge the batteries (e.g., using conductive powders or fluids as described herein). For battery component waste (e.g., defect electrode sheets, residual slurry), the recycling of these waste can start from 220 or 230.

Before or after 210, the battery can be sorted according to the cathode materials by elemental analytical tools (e.g., X-ray fluorescence). The elements in the cathode materials can be identified with or without dismantling the pouch cover. The batteries with the same cathode materials can be grouped together for further processing.

The method 200 also includes, at 220, physical disassembly of the batteries. In some embodiments, the batteries include prismatic battery cells and the pouch of these cells are cut and removed at 220. In some embodiments, the batteries include cylindrical cells and the cases of these batteries are cut and removed at 220. In addition, each battery is also processed into multiple core sections, and such processing can be substantially similar to step 110 in the method 100 described herein. In some embodiments, each core section includes at least an anode section, a cathode section, and a separator disposed in between. The output of step 220 includes: (1) pouch and/or case materials that are collected; and (2) core sections for subsequent processing.

The core sections from 220 are then processed at 230, which includes chemical processing and separation. At this step, the core sections are disposed in a solvent that dissolves the binder of the electrodes resulting a mixture of current collector, cathode materials, anode materials, electrolyte, and separators. The active element of the cathode materials is substantially homogenized during 230 (similar to the step 120 in the method 100 described herein). The homogenized cathodes materials can be extracted via centrifugal process. The metal parts (e.g., Al or Cu current collectors), the separator, and the electrolyte can also be separated and recycled. More details of the chemical processing and separation process are provided below with reference to FIGS. 6 and 7.

At 240, the cathode materials are processed to produce battery-grade cathode materials. As described herein, the cathode materials produced from 230 are usually deficient in the active element, and the material processing at 240 is employed to replenish the active element. For example, for lithium ion batteries, the material processing 240 can relithiate the cathode materials. More details of the material processing are provided below (e.g., with reference to FIGS. 10A-10B).

Figures 3A, 3B:
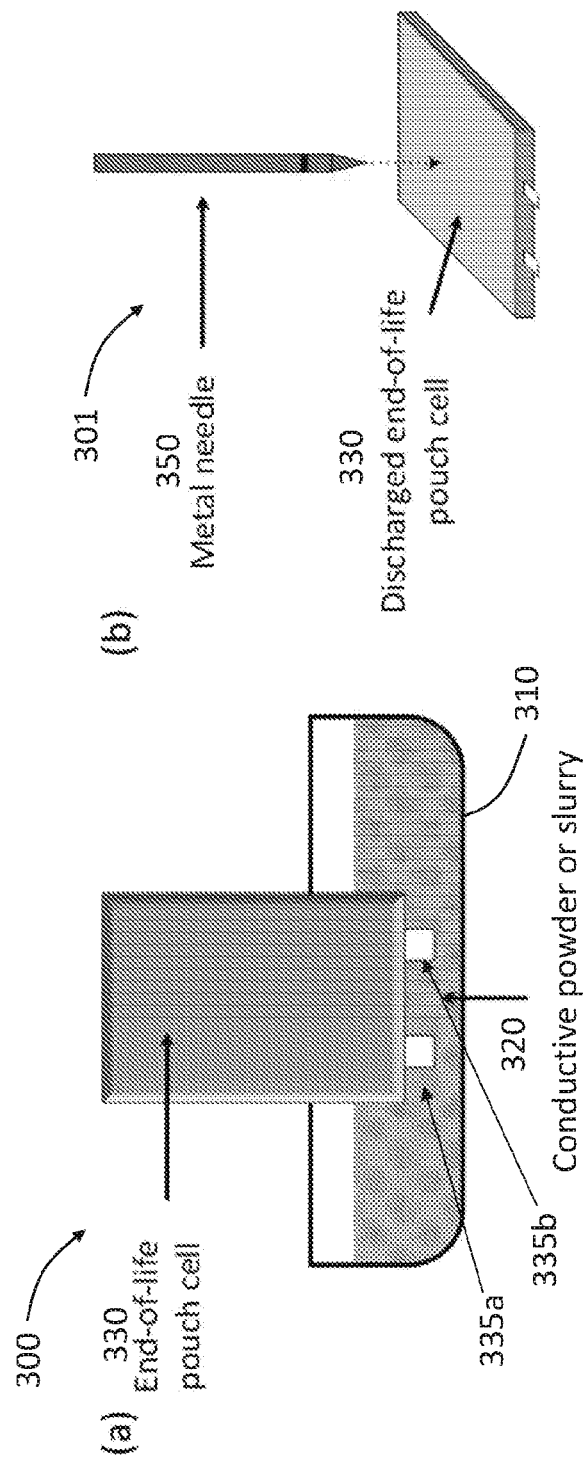
FIGS. 3A and 3B illustrate deactivation and charge state estimation, respectively, of a battery, in accordance with some embodiments.

FIGS. 3A-3B illustrate deactivation and charge state estimation, respectively, of a battery, in accordance with some embodiments. FIG. 3A illustrates a method 300 of deactivating a battery 330. In the method 300, the two tabs 335a and 335b of the battery (also referred to as two leads 335a and 335b), which are electrically coupled to the positive and negative electrodes, respectively, are disposed into conductive powders 320 contained in a container 310. The conductive powders 320 are configured to short circuit the battery 330 so as to fully discharge the battery 330, thereby ensure safety during subsequent processing of the battery 330.

The discharge rate in the method 300 can depend on the resistance (or conductivity) of the conductive powders 320. In practice the resistance of the conductive powders 320 can be adjusted by the selection of powder materials and/or the powder particle size. In other words, using different powder material and/or powder particle size can control the discharge rate of the battery 330.

In some embodiments, the conductive powder includes a metal (e.g., aluminum powder, iron powder, copper powder, stainless steel powder, etc.). In some embodiments, the conductive powder includes carbon (e.g., graphite powder, carbon black nanopowder, or carbon nanotubes, etc.). In some embodiments, the conductive powder includes conductive oxide (e.g., indium tin oxide (ITO), ZnO, $In_2O_3$, $SnO_2$, nickel oxides, and manganese oxides, etc.).

The particle size of the conductive powders 320 can be, for example, about 200 nm to about 1 cm (e.g., about 200 nm, about 300 nm, about 500 nm, about 1 µm, about 2 µm, about 3 µm, about 5 µm, about 10 µm, about 20 µm, about 30 µm, about 50 µm, about 100 µm, about 200 µm, about 300 µm, about 500 µm, about 1 mm, about 2 mm, about 3 mm, about 5 mm, or about 1 cm, including any values and sub ranges in between).

FIG. 3A shows that the battery 330 has a prismatic configuration for illustrative purposes only. In some embodiments, the battery 330 can have any other appropriate configurations, such as a cylindrical configuration. In these instances, the entire battery 330 can be immersed into the conductive powers 320 such that the two electrodes of the battery 330 are in electrical connection with each other via the conductive powders 320. In some embodiments, the method 300 can use a conductive fluid as described herein, instead of or in addition to the conductive powder 320, for deactivation.

FIG. 3B illustrates a method 301 of testing the discharge state of the battery 330. In the method 301, a conductive needle 350 is employed to pierce through the battery 330 so as to have electrical contact with both electrodes of the battery 330. In some embodiments, the conductive needle 350 can be replaced by a nail or any other appropriate tool. This piercing process can be employed as safety assurance and quality control of the deactivation method 300 illustrated in FIG. 3A. In some embodiments, smoke detectors or gas sensors are employed to detect smoke and gas, respectively, during the method 301. In the event that the battery 330 fails during deactivation 300 and/or discharge state testing 301 (e.g., the battery 330 catches fire), the failed battery 300 can be immediately immersed in liquid (e.g., salt water) to prevent fire or smoke.

FIGS. 4A-4D illustrate a method 400 of processing a battery 470 into multiple core sections 475, in accordance with some embodiments. The method 400 is implemented using an apparatus 401, which includes a die 410 coupled to a base 430 via two springs 420, a punch 440 (also referred to as a cutter 440 or a blade 440) that is movable along two guiding pillars 450 (also referred to as guiding posts 450). The battery 470 is placed on a holder 460 for processing. In some embodiments, the pouch or case of the battery 470 is removed before the battery 470 is placed on the holder 460.

Figure 4B:
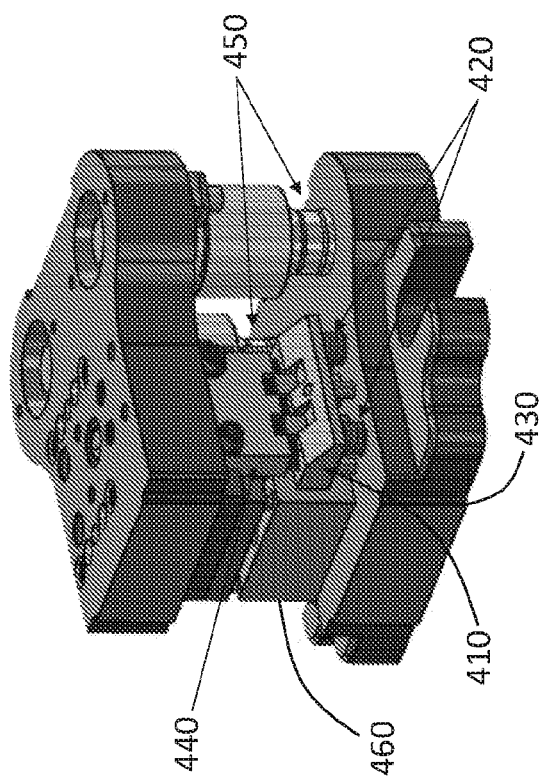
Figure 4A:
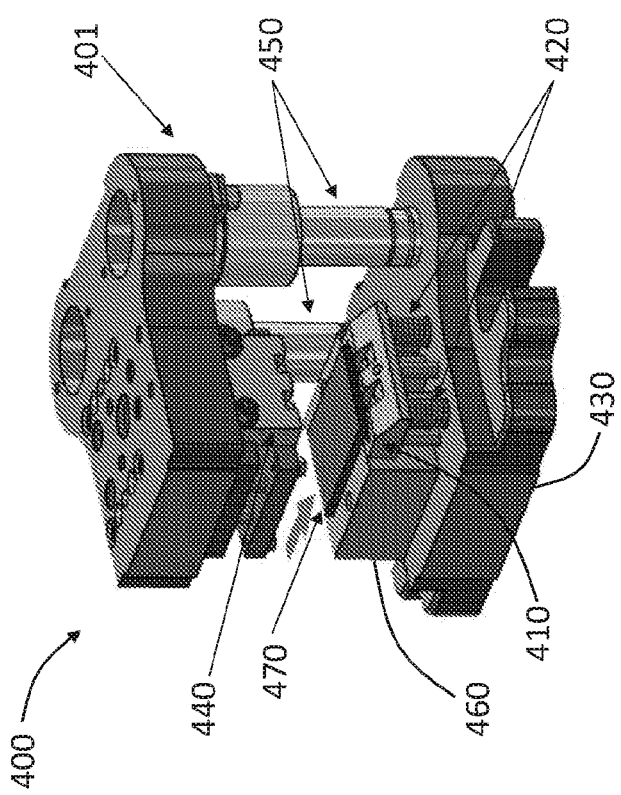

FIG. 4A shows that the battery 470 is advanced toward the die 410 such that at least a portion of the battery 470 is right above the die 410. At this step, the die 410 is open and the springs 420 are extended (i.e. not compressed). In some embodiments, the battery 470 can be manually advanced toward the die 410. In some embodiments, a conveyor or a pusher (not shown in FIG. 4A) can be employed to place the battery 470 under the punch 440.

FIG. 4B shows that the punch 440 is pressed against the battery 470 by moving down along the guiding pillars 450 so as to cut the battery 470. In some embodiments, the punch 440 can be manually pressed against the battery 470. In some embodiments, a motor (not shown in FIG. 4A) can be employed to control the motion of the punch 440. In some embodiments, a pusher can be employed to push the battery 470 and advance the battery 470 incrementally for punching. At this step, the die 410 is closed and the springs 420 are compressed.

In FIG. 4C, the punch 440 is raised up and the portion of the battery 470 directly underneath the punch 440 is cut into multiple core sections 475. Five core sections 475 arranged in a sequence are illustrated in FIG. 4C. In some embodiments, the punch 440 and the die 410 can be configured to cut the battery 470 into any other number of core sections during one punch. In some embodiments, the punch 440 and the die 410 can be configured to cut the battery 470 into a two-dimensional (2D) array of core sections 475.

In FIG. 4D, the battery 475 is advanced again, allowing the collection of the core sections 475 produced during previous punch. In addition, the advancement also places a new portion of the battery 470 under the punch 440 for another round of processing. This process can continue until substantially the entire battery 470 is processed into core sections.

In FIGS. 4A-4D, only one battery 470 is shown for illustrative purposes only. In some embodiments, the battery 470 can include multiple batteries. The punch 440 and the die 410 can be configured to cut the multiple batteries 470 into a 2D array of core sections 475. In some embodiments, the core sections 475 can be removed via the method described in FIG. 4D. In some embodiments, the holder 460 comprises an orifice that can be opened to release the core sections 475 to a separate location after cutting.

Figures 5A, 5B, 5C:
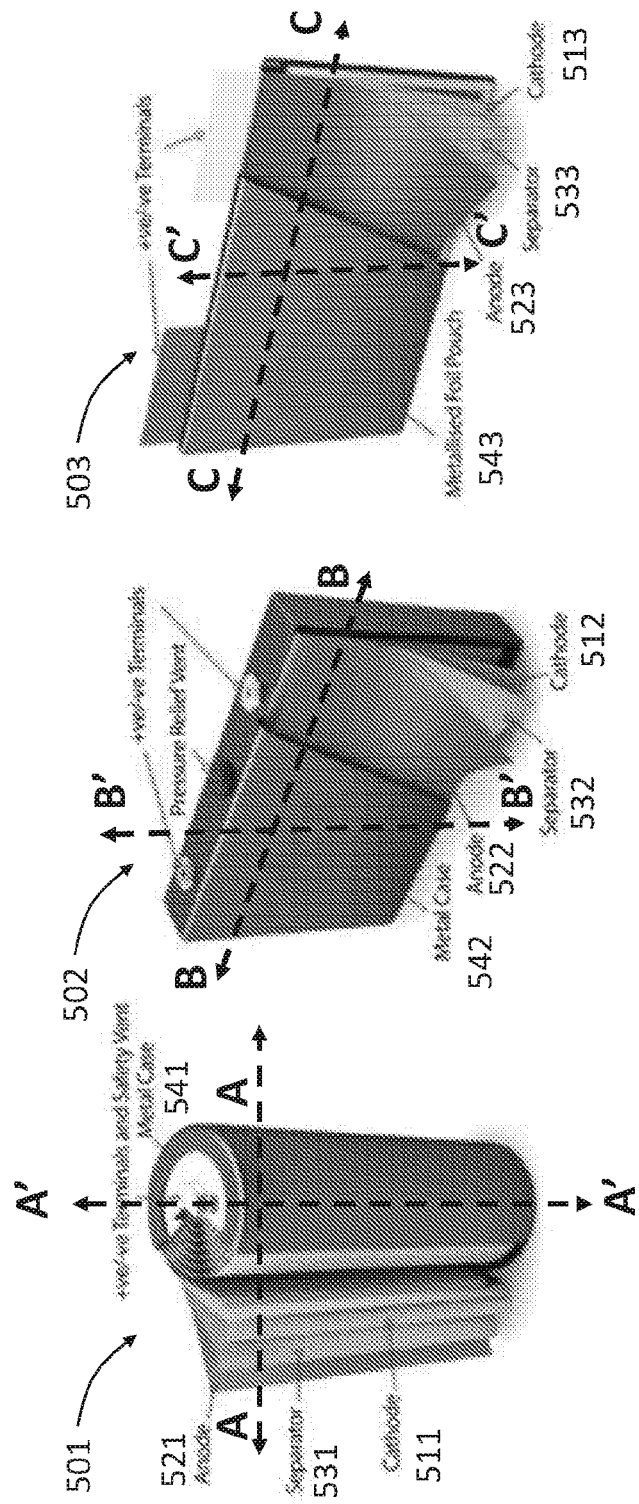
FIGS. 5A-5C show schematics of batteries that can be processed into multiple core sections via the method illustrated in FIGS. 4A-4D, in accordance with some embodiments.

FIGS. 5A-5C show schematics of batteries that can be processed into multiple core sections via the method illustrated in FIGS. 4A-4D, in accordance with some embodiments. FIG. 5A shows a schematic of a battery 501 having a cylindrical configuration. The battery 501 includes at least an anode 511, a cathode 521, and a separator 531 disposed in between. The stack of the anode 511, the cathode 521, and the separator 531 is then rolled into a jellyroll that is contained in a case 541 (usually a metal case), thereby resulting in the cylindrical configuration. The method 400 can be implemented to cut the battery 501 along either the AA line, or the A'A' line, or both as illustrated in FIG. 5A, and each resulting core section can include a shortened jellyroll that includes multiple windings of cathodes, anodes, and separators.

FIG. 5B shows a schematic of a battery 502 having a prismatic case configuration. The battery 502 includes a cathode 512, an anode 522, and a separator 532 disposed in between. The cathode 512, the anode 522, and the separator 532 are stacked together to form a sheet structure that is contained in a case 542 (usually a metal case), thereby forming the prismatic case configuration. The method 400 can be implemented to cut the battery 502 along either the BB line, or the B'B' line, or both, as illustrated in FIG. 5B. In some embodiments, the battery 502 can include a multi-stack structure, and each stack includes a cathode, an anode, and a separator. As a result, each core section produced by the method 400 includes multiple cathode sections, anode sections, and separator sections. In some embodiments, the batteries 501 and 502 illustrated in FIGS. 5A-5B can be cut open on at least one end so as to expose the battery cores, which can be pushed out for further processing (e.g., punching).

FIG. 5C shows a schematic of a battery 503 having a prismatic pouch configuration. The battery 503 includes a cathode 513, an anode 523, and a separator 533 disposed in between. The cathode 513, the anode 523, and the separator 533 are stacked together to form a sheet structure that is contained in a pouch 543 (usually a metal foil), thereby forming the prismatic pouch configuration. The method 400 can be implemented to cut the battery 503 along either the CC line, or the C'C' line, or both, as illustrated in FIG. 5C. In some embodiments, the battery 503 can include a multi-stack structure, and each stack includes a cathode, an anode, and a separator. As a result, each core section produced by the method 400 includes multiple cathode sections, anode sections, and separator sections.

The cutting lines AA, A'A' BB, B'B', CC, and C'C' as illustrated in FIGS. 5A-5C are substantially parallel to at least one edge of the batteries 501 to 503. In some embodiments, any other appropriate cutting lines can also be used. For example, the cutting of the batteries 502 and 503 can occur along diagonal lines of the case/pouch.

Figure 6:
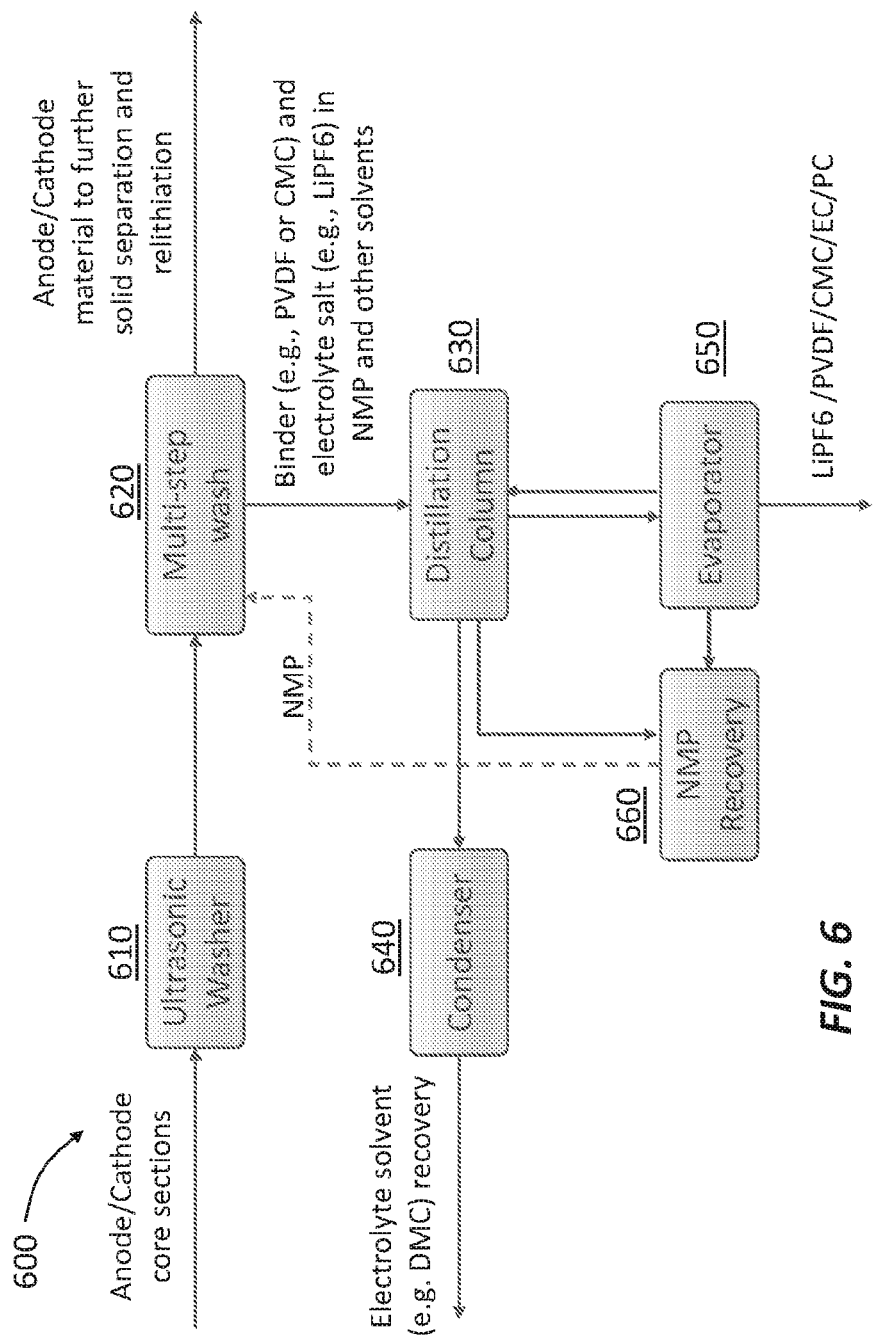
FIG. 6 is a flowchart illustrating a method of chemical processing and separation in direct recycling of batteries, in accordance with some embodiments.

FIG. 6 is a flowchart illustrating a method of chemical processing and separation in direct recycling of batteries, in accordance with some embodiments. The method 600 includes, at 610, ultrasonic washing of core sections produced from batteries. Each core section includes at least one anode/cathode/separator assembly. The core sections are disposed into a solvent that dissolves binders as well as electrolyte solvents and electrolyte salt. At this step, the core sections are separated into individual components, including cathode/anode materials (usually in particle form), separator pieces, and current collector pieces. These components are mixed together in a mixture.

The method 600 also includes, at 620, extracting the mixture of anode and cathode materials via a multi-step wash process in a separation equipment (e.g., filter-mixer-dryer (FMD), and/or centrifuge type equipment, such as batch centrifuge or continuously operated decanter). In other words, during this step, the mixture of anode and cathode materials is separated from other components in the mixture produced at 610. The mixture of the anode and cathode materials is then sent for relithiation, while the rest of the components (e.g., binder, electrolyte salt, etc.) undergo further separation.

At 630, a distillation column is used to separate components of the effluent from the multi-step wash 620 according to their respective boiling points. As the effluent travels down through the distillation column, components are evaporated and are subsequently condensed by one or more condensers (at 640) that operate at appropriate condensing temperatures. The condensers are configured to extract electrolyte solvents (e.g. DMC), which are then collected for transfer to an off-site solvent recovery company. At least one condenser, which can be incorporated within a solvent recovery system (see, e.g., step 660), operates at an appropriate temperature to condense the wash solvent vapor that exits the distillation column. The condensed wash solvent from this condenser is combined with solvent recovered from other operations (e.g., drying) and is returned to the primary wash process (e.g., 620). Liquid effluent from the bottom of the distillation column (e.g., from step 630) is evaporated in the evaporator (at 650) and the vapor travels up through the distillation column, heating the column, and providing vapor to the respective condensers. Solvents with high boiling points (e.g. EC and PC) along with solids (e.g., $LiPF_6$, PVDF, and CMC) are discharged from the evaporator in a waste stream.

Figure 7:
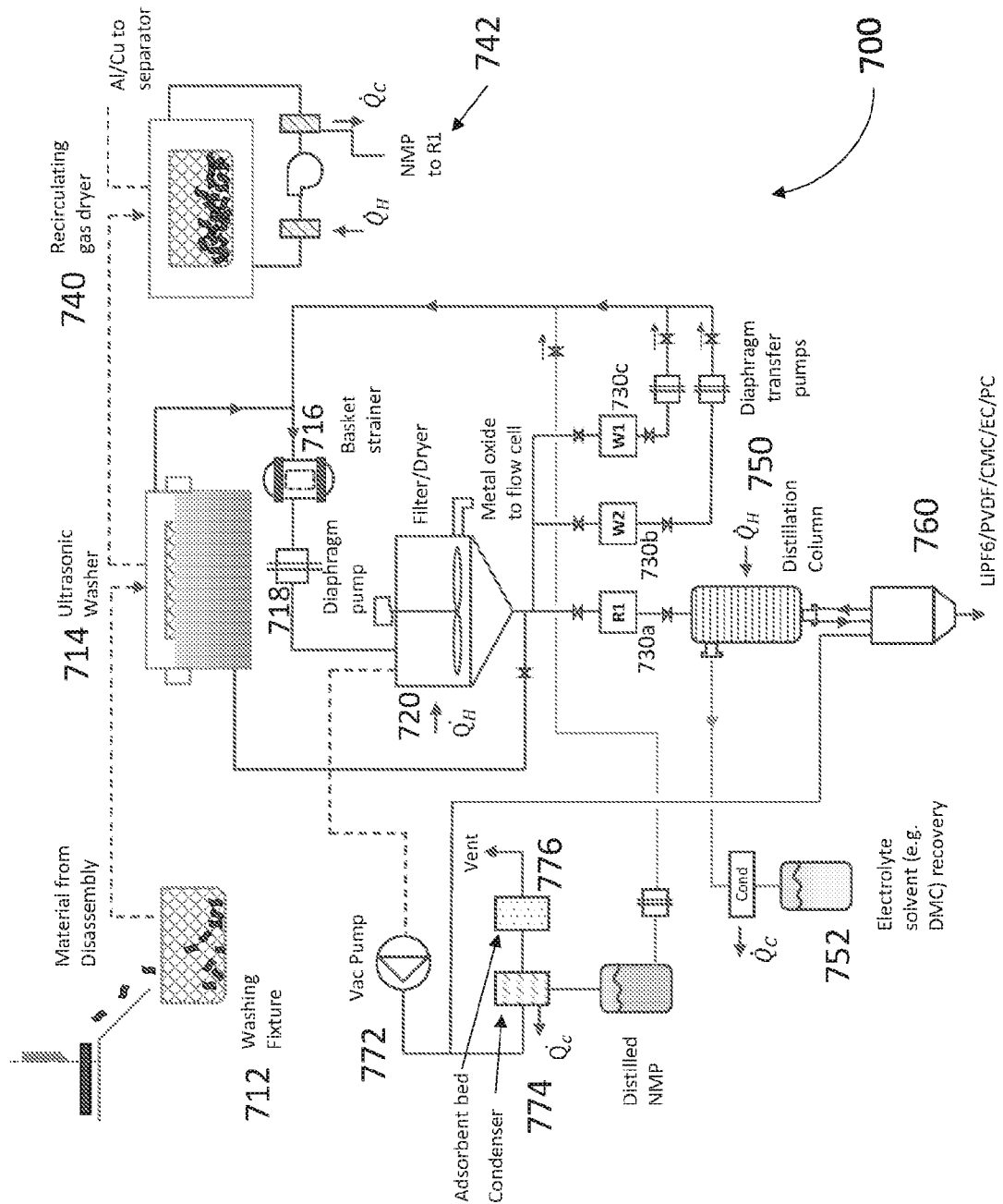
FIG. 7 illustrates a system for chemical processing and separation in direct recycling of batteries, in accordance with some embodiments.

FIG. 7 illustrates a system 700 for chemical processing and separation during direct recycling of batteries, in accordance with some embodiments. The chemical processing and separation process further includes three separation processes (i.e. a first separation process a second separation process and a third separation process) and one solvent recovery process, each of which can be implemented in either batch configuration or continuous flow configuration.

The system 700 includes a washing fixture 712 to receive core sections of batteries (e.g., produced by the method 400 illustrated in FIGS. 4A-4D). In some embodiments, the washing fixture 712 includes a metal wire basket. In some embodiments, the washing fixture 712 includes a perforated basket. Any other appropriate fixture can also be used. In some embodiments, each core section includes multiple layers of anode sheet (i.e., copper collector, active anode material, and anode binder), electrolyte filled separator, and cathode sheet (i.e. aluminum collector, active cathode material, and cathode binder).

The system 700 also includes an ultrasonic washer 714 to receive the washing fixture 712 that is loaded with the core sections. The ultrasonic washer 714 is configured to contain a wash solvent (e.g., organic solvent, such as N-Methyl-2-pyrrolidone, NMP, or aqueous solution) (also referred to as the wash solvent herein). In some embodiments, the ultrasonic washer 714 defines a headspace above the wash solvent, and the headspace can be filled with an inert gas (e.g., nitrogen).

The first separation process is implemented in an ultrasonic washer 714 in which the wash solvent is agitated by propellers or fluid jets of solvent to suspend the core sections. In addition, an ultrasonic transducer is employed to deliver ultrasonic waves into the suspension so as to increase the efficiency of the chemical processing. In some embodiments, the ultrasonic transducer can be located in the ultrasonic washer 714. In some embodiments, the ultrasonic transducer can be located adjacent to the walls of the ultrasonic washer 714.

As a result of the agitation and ultrasonic action, the core sections separate into components. In addition, the ultrasonic agitation with the wash solvent dissolves the anode and cathode binders and frees the active material from the surfaces of the current collectors. Further, the electrolyte solvents (e.g. DMC, PC, and EC) and the electrolyte salt (e.g., $LiPF_6$) dissolve into the wash solvent. The suspension leaving the ultrasonic washer 714 includes: (1) microscopic active material particles from both anode and cathode; (2) larger separator pieces; and (3) chips of current collector material that might overflow the washer. These components are all suspended in a mixture of the wash solvent and the electrolyte salt.

A strainer 716 is employed in the system 700 to receive the suspension from the ultrasonic washer 714. The strainer 716 is configured to remove separator pieces and debris in the suspension when the suspension passes through the strainer 716. A pump 718 (a diaphragm pump) is operably coupled to the strainer 716 to provide sufficient pressure so as to force the suspension through a filter-mixer-dryer (FMD) 720, where the microscopic active material is separated from the suspension. In some embodiments, the separation can be achieved by a centrifugal equipment, instead of or in addition to the FMD 720. The centrifugal equipment can include, for example, a decanter, which can separate materials in a mixture based on different densities of the materials and discharge the materials with different densities out of different outlets. In some embodiments, the separation can be facilitated by blending in a liquid. For example, a mixture can include two solid materials, each of which has a distinct density, and a heavy liquid having a density between the two densities of the two solid materials can be blended into the mixture. Examples of heavy liquids can include bromoform, tetrabromoethane, methylene iodide, sodium polytungstate, sodium metatungstate, and lithium metatungstate, among others.

The filtrate leaving the FMD 720 returns to the washer 714 through nozzles located at the bottom of the washer 714. The nozzles may be configured to provide fluid jets for agitation of the core sections or agitation may be provided by a propellor. The agitation and ultra-sonication process in the washer 714 continues until: (1) all of the core sections have separated into individual components; (2) the cathode materials are removed from the cathode current collectors; and (3) the anode materials are removed from the anode current collectors.

The first separation process is carried out in a series of quasi-countercurrent wash stages (e.g. 3 stages are illustrated but more or fewer stages can be used). After a prescribed length of time, the washer 714 is drained as the filtrate leaving the FMD 720 is diverted to a first storage tank 730*a* (R1) for subsequent recycling. In the first wash stage, the FMD 720 is refilled with filtrate stored from a subsequent wash stage (supplied from tank W2), which has lower concentrations of dissolved solids than the liquid from the ultrasonic washer 714. The material in the FMD 720 is agitated in suspension and after a prescribed length of time, the FMD 720 is drained again as filtrate leaving the FMD 720 is diverted to the ultrasonic washer 714 for reuse. In the second wash stage, the FMD 720 is refilled with filtrate stored from a subsequent wash stage (supplied from tank W1), which has lower concentrations of dissolved solids than the filtrate from the wash stage 1. The material in the FMD 720 is agitated in suspension and after a prescribed length of time, the FMD 720 is drained again as filtrate leaving the FMD 720 is diverted to a storage tank 730*b* (designated W2 for twice-used fluid) for subsequent reuse. In the third wash stage, the FMD 720 is then refilled with distilled or virgin wash solvent, which has no dissolved solids. The wash process is resumed until, after a prescribed length of time, the FMD 720 is drained again and filtrate leaving the FMD is diverted to a third storage tank 730*c* (designated W1 for once-used fluid) for subsequent reuse.

After the final wash, the microscopic solids retained in the FMD 720 are drained of fluid by pressurizing the FMD 720 with dry nitrogen. Then, the solids are heated and stirred in the FMD 720 under vacuum to accomplish drying. In some embodiments, the wet solids can be removed from suspension by other processes such as centrifugation for drying in a dedicated dryer (not shown in FIG. 7). The dried solids (i.e. mixture of anode and cathode active material) are discharged from the FMD 720 or from the dedicated dryer for subsequent processing, such as relithiation.

After the first separation process, the wash fixture 712 contains only the bare current collector pieces. At this point, the wash fixture 712 can be mechanically agitated to encourage drainage of any remaining wash solvent. The wash fixture 712 is then removed from the washer 714 and placed into a recirculating gas dryer 740. Heated gas (e.g. nitrogen) flows through the dryer 740 so as to agitate the current collector pieces and evaporate residual wash solvent. The gas from the dryer 740 is cooled to a low temperature, causing the solvent vapor to condense. The condensate is then transferred to a recycle tank (R1) 742 for subsequent purification and reuse. After the solvent vapor has been condensed and removed, the gas is reheated and recirculated into the dryer 740 to evaporate additional solvent. After drying, the current collector pieces are transferred from the wash fixture 712 to the third separation process to separate the aluminum and copper flakes.

In the solvent recovery process, the solvent mixture (e.g., wash solvent mixed with electrolyte solvents and salts) from the first recycle tank 730*a* (R1) is transferred to a distillation column 750. In the distillation column 750, components of the effluent from the first recycle tank 730*a* are separated according to their respective boiling points. As the effluent travels down through the distillation column, components are evaporated and are subsequently condensed by one or more condensers and then stored in a container 752. The condensers and associated containers extract electrolyte solvents (e.g., DMC) that are then transferred to an off-site solvent recovery company. At least one condenser, e.g., 774, operates at an appropriate temperature to condense the wash solvent (e.g. NMP) vapor that exits the distillation column 750. The condensate from the condenser 774 is collected for reuse in the wash process. Liquid effluent from the bottom of the distillation column 750 is evaporated in an evaporator 760, and the resulting vapor travels up through the distillation column 750, heating the distillation column 750, and providing vapor to the respective condensers. Solvents with high boiling points (e.g., EC and PC) along with solids (e.g., $LiPF_6$, PVDF, and CMC) are discharged from the evaporator in a waste stream.

A vacuum pump 772 is included in the system 700 to remove pure wash solvent vapor from the FMD 720 during the drying operation. The vacuum pump 772 discharges the wash solvent vapor to the condenser 774, where the vapor is condensed along with wash solvent vapor from the distillation column 750. Non-condensable gases (primarily nitrogen) that exit the condenser 774 pass through an adsorbent bed 776 to remove remaining organic vapor and are then discharged to the atmosphere. In the third separation process, the anode collector pieces (e.g. copper with a density of 9.0 g/cm3) are separated from the cathode collector pieces (e.g. aluminum with a density of 2.7 g/cm3) using a vibratory separation process.

A vacuum pump 772 is included in the system 700 to removes pure wash solvent vapor from the solvent recovery still 760 and from the FMD 720 during the drying operation. The vacuum pump 772 discharges the wash solvent vapor under pressure to a condenser 774, where the wash solvent is condensed and collected for reuse. Non-condensable gases (primarily nitrogen) pass through an adsorbent bed 776 to remove remaining organic vapor and are then discharged to the atmosphere. In the third separation process, the anode collector pieces (e.g. copper with a density of 9.0 g/cm3) are separated from the cathode collector pieces (e.g. aluminum with a density of 2.7 g/cm3) using a vibratory separation process.

FIGS. 8A-8C illustrate a lithium equilibration process 800 during scalable direct recycling of batteries, in accordance with some embodiments. In the process 800, lithium deficient cathode active materials 820a and 820b from batteries at different state of charge can reach lithium homogeneity by suspending the lithium deficient cathode materials 820a and 820b into a mixture 810 that includes conductive carbon 814 in lithium containing salt solution 812.

As illustrated in FIG. 8A, the cathode and anode active materials mixture (e.g., produced during step 120 in the method 100, during step 230 in the method 200, during the method 600, or the method 700) is immersed in the lithium salt solution 812 to form the suspension. The solvent can be water or an organic solvent (e.g. NMP, DMC). The lithium salts can be, for example, $LiPF_6$, LiOH, $Li_2SO_4$, LiCl, or $LiNO_3$, and the concentration can be in the range of about 1M to about 5M depending on the solubility of the salt. In some embodiments, the conductive carbon 814 can be contributed directly by the conductive components of the anode active materials. In some embodiments, the conductive carbon 814 can be added into the mixture 810 from an external source.

FIG. 8B shows that the suspension goes through a lithium equilibration process to achieve homogeneity of the lithium content among the lithium deficient cathode materials 820a and 820b. After suspending the lithium deficient cathode materials 820a and 820b (denoted as $Li_{x1}CoO_2$ and $Li_{x2}CoO_2$, where x1>x2) and the conductive carbon 814 in lithium salt solution 812, electrons and lithium-ions start flowing from $Li_{x1}CoO_2$ 820a to $Li_{x2}CoO_2$ 820b. Such a transport produces a homogeneous composition $Li_xCoO_2$ for all the particles in the suspension, as illustrated in FIG. 8C.

As described herein, the lithium equilibration process 800 can take place during the chemical processing (e.g., step 120 in the method 100, step 230 in the method 200, the methods 600 and 700), thereby allowing simultaneous chemical separation and lithium equilibration. This is because the solvent NMP used in these processing steps can dissolve electrode binders (e.g., PVDF, aqueous binder CMC, etc.) and is also miscible with battery electrolyte to form ionic conductive lithium containing solution.

In some embodiments, the lithium equilibration process can occur in sheet form before chemical processing when active electrode materials are still attached to the current collectors. When multiple sheets of cathode material-coated collector are electrically connected, the lithium-ion and electron transfer can occur based on similar mechanisms illustrated in in FIGS. 8A-8C.

Figures 9A, 9B, 9C:
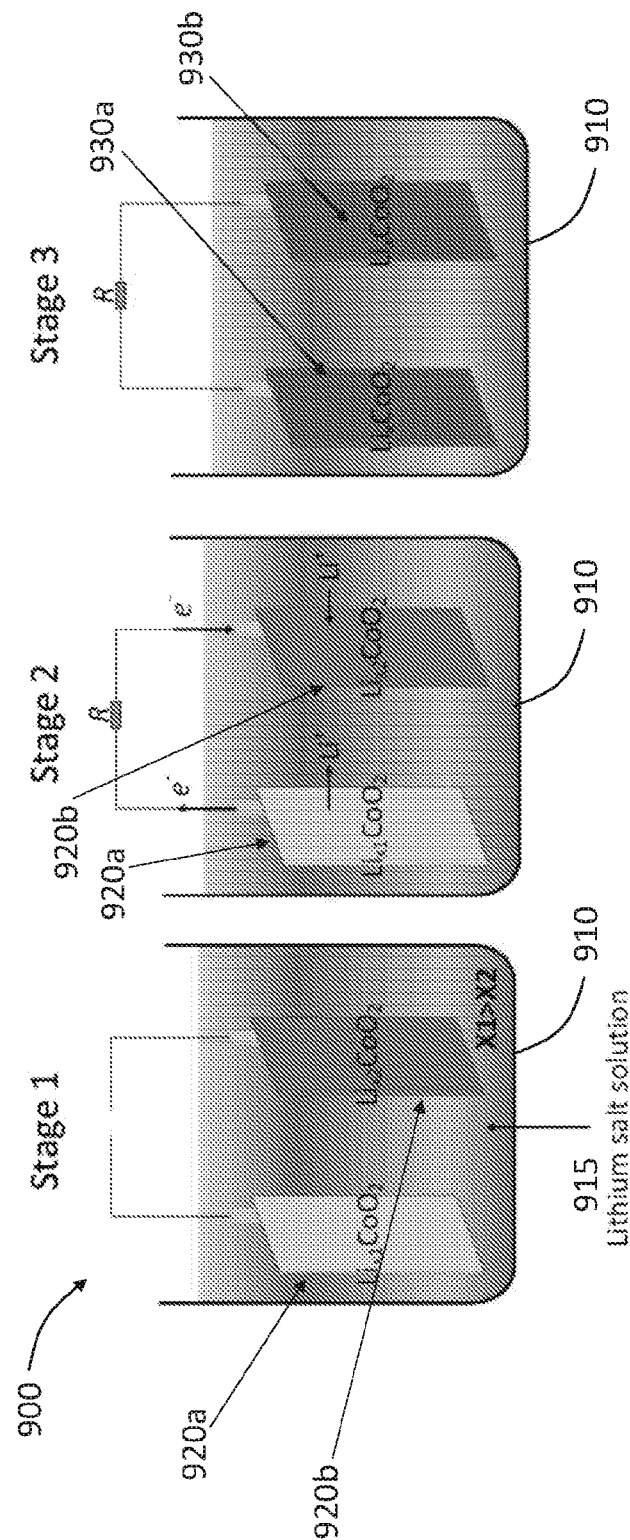
FIGS. 9A-9C illustrate a lithium equilibration process of electrodes in a sheet form, in accordance with some embodiments.

FIGS. 9A-9C illustrate a lithium equilibration process 900 of electrodes in a sheet form, in accordance with some embodiments. In the process 900, two cathodes sheets 920a and 920b are immersed in a lithium salt solution 915 contained in a vessel 910. The first cathode sheet 920a includes a first lithium deficient material denoted as $Li_{x1}CoO_2$ and the second cathode sheet 920b includes a second lithium deficient material denoted as $Li_{x2}CoO_2$, as illustrated in FIG. 9A.

FIG. 9B shows that the two cathode sheets 920a and 920b are electrically coupled to each other, thereby allowing the transport of electrons and lithium ions between the two cathode sheets 920a and 920b. More specifically, lithium ions leave the first cathode sheet 920a and enter the second cathode sheet 920b, thereby producing two cathodes sheets 930a and 930b having the same cathode material $Li_xCoO_2$, as illustrated in FIG. 9C.

In some embodiments, after equilibration, the cathode active material can be separated from the current collectors in a wash process similar to that described above for the core sections to yield a cathode active material that has a uniform but nonstoichiometric amounts of lithium.

The lithium deficient cathode materials having a homogenous lithium distribution can then be assessed to determine the lithium stoichiometry. Lithium salt (e.g., LiOH, $Li_2CO_3$, etc.) can be added to address the lithium deficiency using dry powder or wet slurry mixing equipment (e.g., rotary mixer, blender, etc.), i.e. relithiation. The resulting mixture can be heat treated to restore the lithium stoichiometry in the active material and to address damage to the active material structure.

The relithiation of lithium deficient cathode materials can be achieved via at least two approaches. In the first approach, a lithium containing material is employed. The lithium containing material has a particle size that is similar to the particle size of the lithium deficient cathode materials to be relithiated. Examples of such lithium containing material include $LiOH.H_2O$ powder, $Li_2CO_3$, and $LiCH_3COO$, among others. The description herein uses $LiOH.H_2O$ for illustrative purposes only. In some embodiments, any other lithium containing materials described herein can also be used.

In this first approach, the lithium deficient cathode material (e.g., $Li_xCoO_2$, where x<1) is homogenously mixed with the lithium containing material to form a mixture. In some embodiments, the mixture is in a stoichiometric ratio of 1 mol $Li_xCoO_2$ to (1−x) mol of $LiOH.H_2O$. Typically, $Li_xCoO_2$ from a fully cycled (i.e., end-of-life) cathode has an x value of about 0.5. In this case, the mass ratio of 1 $Li_xCoO_2$ to (1−x) $LiOH.H_2O$ is about 298.6 milligrams (mg) to 177.46 mg.

In some embodiments, the x value can deviate from 0.5 (e.g., the battery has not been fully cycled). In these instances, the x value can be determined by elemental analytical techniques, such as inductively coupled plasma atomic emission spectroscopy (ICP-AES). The molar amount of (1−x) mol of $LiOH.H_2O$ can then be adjusted accordingly.

In some embodiments, an extra amount of $LiOH.H_2O$ can be added to the mixture so as to compensate for lithium losses during high temperature heating. In some embodiments, the extra amount of $LiOH.H_2O$ can be about 3% to about 8% of the original amount (e.g., about 3%, about 3.5%, about 4%, about 4.5%, about 5%, about 6%, about 7%, or about 8%, including any values and sub ranges in between).

The resulting homogeneous mixture can be pressed into a cylindrical pellet form or any other appropriate compact form. The pellet form can facilitate uniform processing during relithiation. The cylindrical pellet(s) are then heated at an elevated temperature in air. The elevated temperature of the heating can be anywhere between 100° C. to about 1000° C. (e.g., about 100° C., about 200° C., about 300° C., about 400° C., about 500° C., about 600° C., about 700° C., about 800° C., about 900° C., or about 1000° C., including any values and sub ranges in between). The duration of the heating can be about 1 hour to about 24 hours (e.g., about 1 hour, about 2 hours, about 3 hours, about 4 hours, about 5 hours, about 10 hours, about 12 hours, or about 24 hours, including any values and sub ranges in between). In some embodiments, the resulting homogeneous mixture can be directly sintered without forming a compact form. For example, a rotating furnace can be used to directly sinter the homogeneous mixture in a powder form.

In some embodiments, the elevated temperature used in the heating can be substantially equal to or below 500° C., which is below the sintering temperature of the cathode material. Heating within this temperature range can save energy and alleviate decomposition of residual organics within the material and carbon deposits. The decomposition can be detrimental because it may form gas that can prevent cracks within the $LiCoO_2$ crystals from healing during the heating. Inadequate crack healing can allow particles to fracture, which in turn can decrease the size of the $LiCoO_2$ particles. As a result, the particle morphology of the $LiCoO_2$ particles may be different than that used to form new batteries.

The heating step can drive the reaction according to Equation (1) below and also proceed to recrystallize $LiCoO_2$.

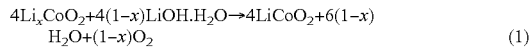
(1)

The resulting re-lithiated cathode material from Equation (1) can then be removed from the oven and is ready to be reused as a raw material for cathode manufacturing, i.e. battery grade cathode material.

Figure 10A:
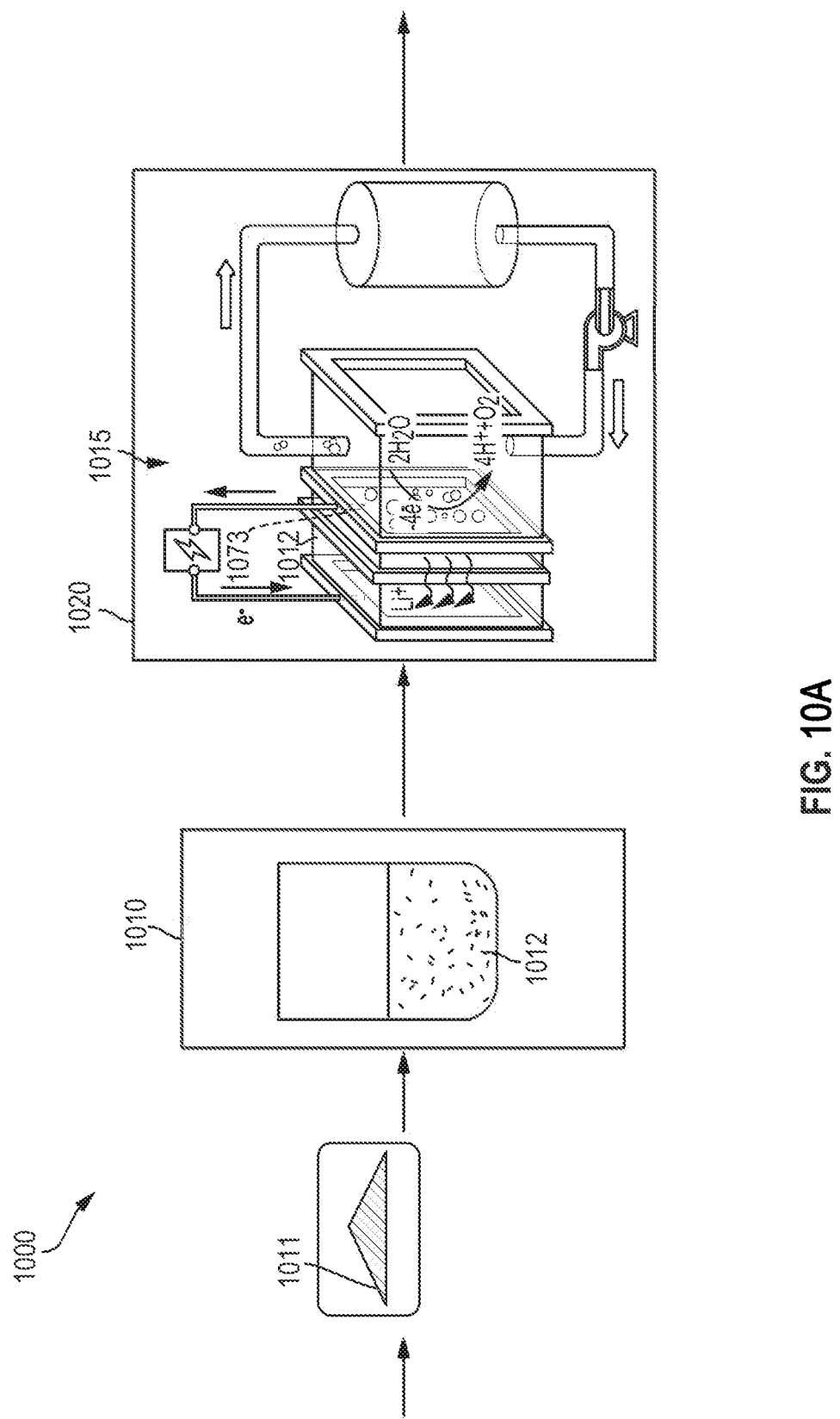
FIGS. 10A and 10B illustrate a method of relithiation, in accordance with some embodiments.
Figure 10B:
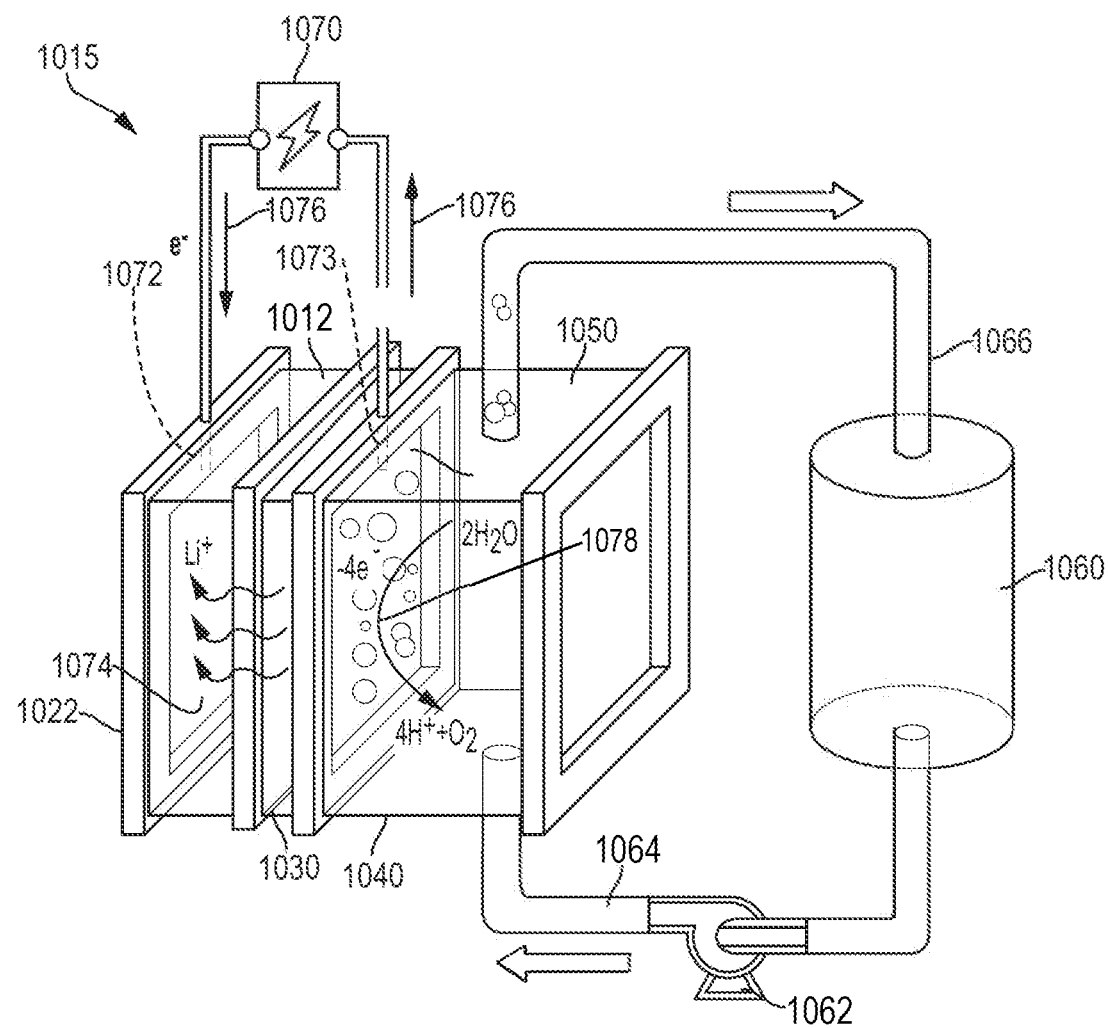

FIGS. 10A and 10B illustrate a method 1000 of relithiation according to the second approach, in accordance with some embodiments. The description of the method 1000 herein uses $LiCoO_2$ as the cathode material for illustrative purposes only. In practice, any other cathode material described herein can also be relithiated via the method 1000.

The method 1000 begins with a lithium deficient cathode material 1011 (e.g., produced from step 120 in the method 100, step 230 in the method 200, method 600, or method 700). At 1010, the lithium deficient cathode material (e.g. powdered $Li_xCoO_2$) is placed into a cathode suspension 1012 containing at least one lithium salt. Examples of lithium salts that can be used here include, but are not limited to lithium sulfate, lithium nitrate, and lithium chloride suspended as an aqueous suspension. Alternatively, organic solvents can also be used and examples of such organic solvents can include dimethyl carbonate (DMC) and ethylene carbonate (EC).

In some embodiments, the concentration of the cathode suspension 1012 may range from seawater lithium concentration of about 100 micrograms (µg) per liter (L) to about 1 mol/L of an artificial or "pure" solution, meaning only lithium based salts are in the solution. In some embodiments, the method 1000 can utilize all lithium ion containing solutions. The lithium deficient cathode material can be combined with the lithium salt suspension in a one to one ratio by volume.

At 1020 of the method 1000, the $Li_xCoO_2$ within the $Li_xCoO_2$/lithium salt suspension 1012 is re-lithiated within a relithiation electrochemical flow system 1015, which is illustrated in FIG. 10B. The system 1015 includes a galvanic cell, which includes a cathode chamber 1022, an anode chamber 1040, and a galvanic separator 1030. The cathode chamber 1022 and the anode chambers 1040 can be made of any non-reactive material, such as stainless steel, glass, or polymer, among others. Each of the cathode chamber 1022 and the anode chamber 1040 has an opening that interfaces to the galvanic separator 1030. In some embodiment, a first seal (e.g., made of rubber, silicone, or other resilient material) can be disposed between the cathode chamber 1022 and the galvanic separator 1030 to prevent leaks. In some embodiments, a second seal can be disposed between the anode chamber 1040 and the galvanic separator 1030 to prevent leaks.

A working electrode 1072 is inserted into the cathode chamber 1022. In some embodiments, the working electrode 1072 can be made of nickel mesh. In some embodiments, the working electrode 1072 can be made of a carbon plate. A counter electrode 1073 is inserted into the anode chamber 1040. In some embodiments, the counter electrode 1073 can include a platinum (Pt) mesh. An additional reference electrode (not shown in FIGS. 10A-10B) can be inserted into either the cathode chamber 1022 or the anode chamber 1040. In some embodiments, the reference electrode can be made of Ag/AgCl.

A constant current power supply 1070 is electrically connected to each of the working electrode 1072 and counter electrode 1073 through conductors. In some embodiments, the working electrode 1072 functions as a current collector while the lithium deficient cathode material functions as the reactant.

The anode chamber 1040 is supplied from, and is hydraulically connected to, a lithium reservoir 1060 through a pressure source 1062 and a feed pipe 1064. In some embodiments, the lithium reservoir 1060 has a first volume greater than a second volume of the anode chamber 1040. In some embodiments, the total charge storage capacity of the lithium reservoir 1060 is at least 5 times greater than the charge storage capacity of the anode chamber 1040. Liquid is returned to the lithium reservoir 1060 through a return pipe 1066.

In some embodiments, the pressure source 1062 includes a pump, such as a centrifugal pump. In some embodiments, any other appropriate technique can be used. For example, the lithium reservoir 1060 can feed the anode chamber 1040 via gravity force and the pressure source 1062 can be disposed in the return pipe 1066.

In some embodiments, the lithium salt containing solution in the anode chamber 1040 may be the same as the lithium salt containing solution used to make suspension 1012. This provides the ability to shortcut the lithium refining process and decrease the cost of restoring/replenishing the depleted lithium. For example, the lithium salt containing solution in the anode chamber 1040 can be a "pure" solution, meaning only lithium based salts are in the solution. In another example, the reservoir 1060 may be an "un-pure" brine pool containing non-lithium based salts and the lithium salt containing solution in the anode chamber 1040 may be the brine in a brine pool containing, for example, one to two weight percent of lithium and any number of other constituent elements.

In some embodiments, the reservoir 1060 may contain seawater, and the lithium salt containing solution in the anode chamber 1040 may also be seawater containing about 183 micrograms (µg) per liter (L). In yet another alternative, the reservoir 1060 may contain a lithium containing wastewater. And in yet another example, the reservoir 1060 may contain any number of lithium containing ores, for example spodumene, amblygonite, lepidolite, or eucryptite, and an alkali-metal hydroxide (for example, KOH) solution can flow over or through the ore resulting in lithium-ion containing solution due to hydroxide solution leaching effect.

In yet another example, the lithium reservoir 1060 can be a source of naturally occurring water that flows during operation of the re-lithiation electrochemical flow system 1015, to re-supply depleted lithium from continued use. For example, the flowing can be caused by pumping the naturally occurring water during operation of the re-lithiation electrochemical flow system. In another example, the flowing occurs due to naturally occurring events, which may include, but are not limited to rainfall, stream or river currents, underwater springs, tidal flow or wave action. And in yet another example, a tidal flow or wave action can be used to fill the lithium reservoir 1060 that subsequently, under the force of gravity, flows the lithium salt containing solution to the anode chamber 1040. Regardless of the lithium source, the flow of lithium from the reservoir 1060, whether it be a stream, seawater, lithium ore, or a pure lithium salt, can replenish lithium to the lithium salt containing solution contained in the anode chamber 1040, to the anode (positive) electrode, and ultimately to the re-lithiation reaction during operation.

The galvanic separator 1030 can include any type of galvanic separator that effectively allows lithium ions to pass through. In some embodiments, the galvanic separator 1030 includes a ceramic separator. In some embodiments, the galvanic separator 1030 includes a porous polymer separator. In some embodiments, a porous polymer separator can be used when the lithium salt containing solution is a pure lithium based salt solution because the pure solution usually does not contain non-lithium ions that can penetrate a porous polymer separator. In some embodiments, a ion-selective polymer which is only permeable to lithium ions can be used for pure lithium salt based solutions as well as non-pure solutions (e.g., seawater, seawater brine, and/or lithium ore based solutions). In some embodiments, a ceramic separator can be used for pure lithium salt based solutions as well as non-pure solutions (e.g., seawater, seawater brine, and/or lithium ore based solutions). Examples of suitable polymer separators include, but are not limited to a fiber paper (for example, Cellulose based), or a trilayer polypropylene-polyethylene-polypropylene membrane having a pore size of about 0.21×0.05 µm and a porosity of about 39%, Examples of suitable ceramic separators include, but are not limited to. $Li_{1+x+y}Al_x(Ti, Ge)_{2-x}Si_yP_{3-y}O$, $(Li_x, La_y)TiO_z$, and $(Li_x, La_y)ZrO_z$.

In operation, the cathode chamber 1022 is filled with the $Li_xCoO_2$ containing placed aqueous suspension 1012. The anode chamber 1040 is filled with a lithium salt containing solution which can be in static or flowing condition. In some embodiments, lithium salt containing solution can be in the static condition, thereby allowing the operation of the system 1015 without the reservoir 1060, the pressure source 1062, and the flow and return pipes 1064 and 1066. The anode chamber lithium salt containing solution may be the same lithium salt containing solution used to make the suspension 1012 or a different solution.

An anodic current is applied to anode chamber 1040, i.e., the constant current power supplies potential such that electrons flow in the directions of arrows 1076. As the electrolyte (lithium salt containing solution) in the anode chamber 1040 is going through an oxygen evolution reaction (OER) 1078, the $Li_xCoO_2$ in the cathode chamber 1022 is reduced and lithium-ions 1074 intercalate into the $Li_xCoO_2$ to form $LiCoO_2$.

The theoretical mechanism of the reactions are shown in equations 2-3 below:

$$Li_xCoO_2+(1-x)Li^++(1-x)e^- \rightarrow LiCoO_2 \quad (2)$$

$$2H_2O \rightarrow O_2+4H^++4e^- \quad (3)$$

The potential of each of the working electrode 1072 and the counter electrode 1073 are measured with respect to the reference electrode until the potential of the working electrode 1072 versus the potential of the reference electrode potential reaches about −0.8 V to about −1.0 V vs. Ag/AgCl. For most lithium-ion battery cathode materials, discharge to −0.8V to −1 V vs. Ag/AgCl can fully restore the lithium content.

One advantage to the re-lithiation electrochemical flow system 1015 is that the amount of lithium-ion intercalation can be precisely controlled by the cut-off potential. Other re-lithiation approaches typically require quantification of the amount of lithium depletion (i.e., the x value in $LixCoO_2$) before determining the optimal amount of lithium containing material to add. The re-lithiation electrochemical flow system 1015, in contrast, can fully convert x to 1 by controlling the cutoff voltage of the electrochemical re-lithiation process without quantifying the x because specific lithium content x in battery cathode materials (e.g., LixCO2, LixFePO4) corresponds to unique electrode materials property (e.g., open circuit voltage, conductivity, lithium transport properties, etc.)

After the reactions (2) to (3), $LixCoO_2$ is re-lithiated to $LiCoO_2$. The re-lithiated $LiCoO_2$ can be removed from the cathode chamber 1022 for reuse (e.g., making new batteries). In some embodiments, the $LiCoO_2$ can be further washed with water, and dried before reuse. In some embodiments, the morphology of the re-lithiated $LiCoO_2$ may be improved via a heating process, after which the re-lithiated $LiCoO_2$ can have the same crystal structure as the commercially available $LiCoO_2$.

Figure 11:
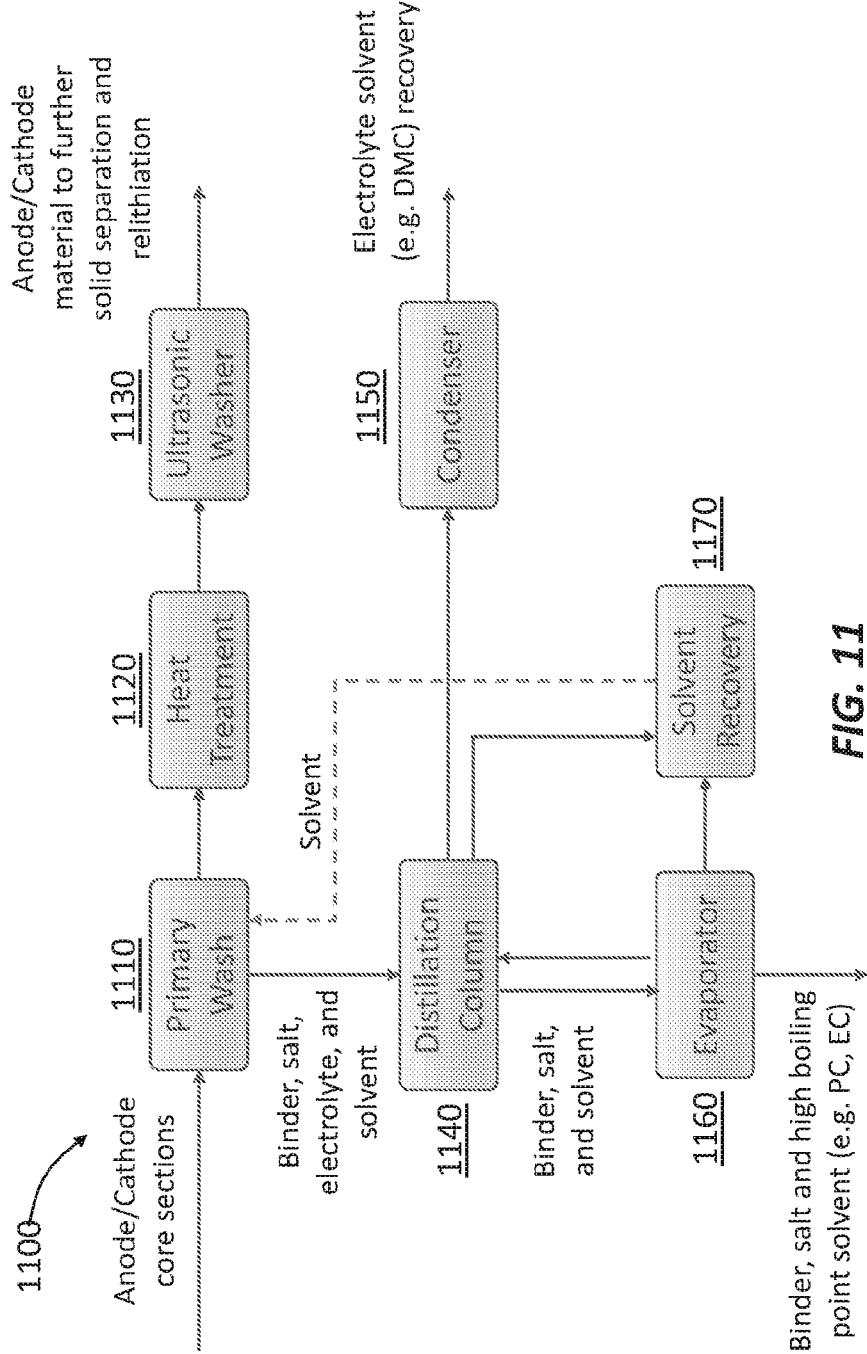
FIG. 11 is a flowchart illustrating a method of chemical processing and separation in direct recycling of batteries, in accordance with some embodiments.

FIG. 11 is a flowchart illustrating a method 1100 of chemical processing and separation in direct recycling of batteries, in accordance with some embodiments. The method 1100 includes, at 1110, a primary wash process in a mixing equipment (e.g., FMD and/or centrifuge type equipment, such as a batch centrifuge or continuously operated decanter) to wash core sections produced from batteries. Each core section can be substantially similar to the core section in the method 100 described with reference to FIG. 1. For example, each core section can include at least one anode/cathode/separator assembly. In this step, some or all of the organic components, such as electrolyte (e.g., EC, DMC, and PC) and binder (e.g., PVDF and CMC), and salt (e.g., $LiPF_6$) are dissolved in a wash solvent (e.g., NMP, DMF, DMSO, or DMAc). The dissolved components (e.g., solvent, electrolyte, salt, and binder) are separated from the solid components (e.g., anode and cathode materials, separator, current collectors, and battery case) via separation methods such as straining, filtration, centrifugation, decanting, solvent rinsing, heating, air drying, vacuum drying, or any combination thereof. In some embodiments, some organic components, such as electrolyte or binder, may remain mixed with the solid components.

In some embodiments, the method 1100 also includes, at 1120, a heat treatment process that removes or degrades some or all of the organic components remaining in the solid components exiting the wash process at 1110. In some embodiments, the heat treatment process also removes or degrades the pieces of separator and/or the pieces of battery packaging. In some embodiments, the solid components are heated to at least 100 degrees Celsius. In some embodiments, the solid components are heated to 200, 300, 400, 500, 600, 700, or 800 degrees Celsius. In other embodiments, the solid components are heated to above 800 degrees Celsius. In some embodiments, the solid components are heated in an oxidizing atmosphere, such as air, oxygen gas, oxygen gas mixed with nitrogen gas, or other combination. In other embodiments, the solid components are heated in a reducing atmosphere, such as hydrogen gas, hydrogen gas mixed with water vapor, hydrogen gas mixed with nitrogen gas, carbon monoxide gas, carbon monoxide gas mixed with carbon dioxide, or other combination. In yet other embodiments, the solid components are heated in an inert atmosphere, such as nitrogen gas, argon gas, or other combination.

The method 1100 also includes, at 1130, a separation process configured to extract the mixture of anode and cathode materials from the rest of the solid components. The separation can be performed, for example, via ultrasonic washing in an ultrasonic washing solvent (e.g., NMP, DMF, DMSO, DMAc, ethanol, propanol or water, or acidic water, or alkaline water). At this step, the solid components are separated into individual components, including cathode/anode materials (usually in particle form), separator pieces, current collector pieces, and/or battery packaging pieces. In some embodiments, at least one filtration system is employed to separate larger separator pieces, current collector pieces, and/or battery packaging pieces from the mixture of the anode and cathode materials. In some embodiments, the at least one filtration system includes a separate ultrasonic transducer to break up agglomeration of particles. The mixture of the anode and cathode materials is then sent for further separation and/or relithiation, while the rest of the components can be disposed of or undergo further separation.

At 1140, components in the effluent from the primary wash 1110 are separated according to their respective boiling points (e.g., using a distillation column). As the effluent travels down through the distillation column, components are evaporated and are subsequently condensed (at 1150) by one or more condensers that operate at appropriate condensing temperatures. The condensers are configured to extract electrolyte solvents (e.g. DMC) that are then collected for transfer to an off-site solvent recovery company. At least one condenser is incorporated within a solvent recovery system and operates at an appropriate temperature to condense the wash solvent vapor that exits the distillation column s as to achieve solvent recovery at 1170. The condensed wash solvent from this condenser is combined with solvent recovered from other operations (e.g., drying) and is returned to the primary wash process 1110. Liquid effluent from the bottom of the distillation column (e.g., after 1140) is evaporated in an evaporator (at 1160) and the resulting vapor travels up through the distillation column, heating the column, and providing vapor to the respective condensers. Solvents with high boiling points (e.g. EC and PC) along with solids (e.g., LiPF6, PVDF, and CMC) are discharged from the evaporator in a waste stream.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the retention/delivery structure disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
processing at least one battery into a plurality of core sections, each core section in the plurality of core sections comprising an anode section, a cathode section including a cathode material, a separator section disposed between the anode section and the cathode section, and an electrolyte; and
disposing the plurality of core sections into a solvent so as to produce a mixture of cathode materials from the plurality of core sections, wherein the solvent and the electrolyte form an ionic conductive medium, and the mixture of the cathode materials is characterized by a substantially homogeneous distribution of an active element in the cathode material.

2. The method of claim 1, wherein the at least one battery includes a lithium ion battery, and the cathode material includes at least one of $LiCoO_2$, $LiMn_2O_4$, $LiFe_tM_{1-t}PO_4$ (LFMP), or $LiNi_aMn_bCo_cAd_dO_2$, where $a+b+c+d=1$, A=Al, Zr, or Mg.

3. The method of claim 2, wherein disposing the plurality of core sections into the solvent includes disposing the plurality of core sections into at least one of dimethylformamide (DMF), dimethyl sulfoxide (DMSO), N-methyl-2-pyrrolidone (NMP), or dimethylacetamide (DMAc).

4. The method of claim 1, wherein the at least one battery includes a first battery at a first state of charge and a second battery at a second state of charge different from the first state of charge.

5. The method of claim 1, wherein the ionic conductive medium further includes conductive carbon from at least one anode section in the plurality of core sections includes.

6. The method of claim 1, further comprises adding conductive carbon into the solvent so as to increase an electronic conductivity of the ionic conductive medium.

7. The method of claim 1, wherein the mixture of the cathode materials is produced without an electrochemical process.

8. The method of claim 1, wherein the mixture of the cathode material includes a lithium deficient compound of the active element in the cathode material.

9. The method of claim 1, wherein the anode section in each core section includes an anode material, the mixture of the cathode materials further includes anode materials from the plurality of core sections, and the method further comprises:
extracting the cathode materials from the mixture of the cathode materials and the anode materials.

10. The method of claim 9, wherein extracting the cathode materials includes separating the cathode materials from the anode materials via a density-based separation process.

11. The method of claim 9, wherein extracting the cathode materials includes separating the cathode materials from the anode materials via a hydrophobicity-based separation process.

12. The method of claim 9, wherein extracting the cathode materials includes separating the cathode materials via a filtration separation process based on a particle size of the cathode materials.

13. The method of claim 9, wherein extracting the cathode materials includes separating the cathode materials via an eddy current separation process.

14. The method of claim 9, wherein extracting the cathode materials includes separating the cathode materials via a heat treatment process.

15. The method of claim 1, further comprising relithiating the cathode materials extracted from the mixture of the cathode materials and the anode materials to produce a battery-grade cathode material.

16. The method of claim 1, further comprising: deactivating the at least one battery before processing the at least one battery into the plurality of core sections.

17. The method of claim 16, wherein deactivating the at least one battery includes contacting the at least one battery with a conductive powder to discharge the at least one battery.

18. The method of claim 17, wherein the conductive powder includes at least one of a metal, a carbon, or a conductive oxide.

19. The method of claim 16, wherein deactivating the at least one battery includes contacting the at least one battery with a conductive fluid.

20. The method of claim 1, further comprising:
penetrating the at least one battery using a conductive needle after deactivating the at least one battery to estimate a state of discharge of the at least one battery.

21. The method of claim 1, further comprising: delivering an ultrasonic wave into the solvent to facilitate production of the mixture of the cathode materials.

22. The method of claim 1, further comprising:
drying and heating the plurality of core sections to at least 400 degrees Celsius to facilitate production of the mixture of the cathode materials.

23. The method of claim 1, further comprising:
transferring the plurality of core sections to a second solvent to facilitate production of the mixture of the cathode materials.

24. The method of claim 23, further comprising:
delivering an ultrasonic wave into the second solvent to facilitate production of the mixture of the cathode materials.

25. The method of claim 1, wherein the at least one battery includes a plurality of batteries, and the method further comprises:
sorting the plurality of batteries into a first group of batteries having a first cathode material and a second group of batteries having a second cathode material.

26. The method of claim 25, wherein sorting the plurality of batteries includes sorting the plurality of batteries using X-ray fluorescence.

27. A method for recycling at least one battery, the method comprising:
cutting a plurality of lithium ion batteries into a plurality of core sections, a first lithium ion battery in the plurality of lithium ion batteries having a first state of charge and a second lithium ion battery in the plurality of lithium ion batteries having a second state of charge different from the first state of charge, each core section in the plurality of core sections comprising an anode section including an anode material, a cathode section including a cathode material, a separator section disposed between the anode section and the cathode section, and an electrolyte;
disposing the plurality of core sections into a solvent so as to produce a mixture of cathode materials and anode materials from the plurality of core sections, wherein the solvent and the electrolyte form an ionic conductive medium, and the mixture of the cathode materials and the anode materials includes a nonstoichiometric compound of an active element in the cathode material and is characterized by a substantially homogeneous distribution of the active element in the cathode material;
extracting the cathode materials from the mixture of the cathode materials and the anode materials; and
relithiating the cathode materials extracted from the mixture of the cathode materials and the anode materials to produce a battery-grade cathode material.

* * * * *